(12) United States Patent
Zaikov et al.

(10) Patent No.: US 11,472,085 B2
(45) Date of Patent: *Oct. 18, 2022

(54) GAS-PERMEABLE BARRIER FILM AND METHOD OF MAKING THE GAS-PERMEABLE BARRIER FILM

(71) Applicant: Berry Plastics Corporation, Evansville, IN (US)

(72) Inventors: Vadim G. Zaikov, Eau Claire, WI (US); Jeffrey A. Middlesworth, Wauconda, IL (US); Bradley Sonnentag, Boyd, WI (US); Brooke D. Kitzmiller, North Canton, OH (US)

(73) Assignee: Berry Plastics Corporation, Evansville, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/431,073

(22) Filed: Feb. 13, 2017

(65) Prior Publication Data

US 2017/0232652 A1    Aug. 17, 2017

Related U.S. Application Data

(60) Provisional application No. 62/296,181, filed on Feb. 17, 2016.

(51) Int. Cl.
*B29C 48/00* (2019.01)
*B29C 48/25* (2019.01)
(Continued)

(52) U.S. Cl.
CPC .......... *B29C 48/0018* (2019.02); *B29C 39/02* (2013.01); *B29C 48/022* (2019.02); *B29C 48/08* (2019.02); *B29C 48/21* (2019.02); *B29C 48/267* (2019.02); *B29C 48/307* (2019.02); *B29C 48/35* (2019.02); *B29C 48/916* (2019.02); *B29C 48/10* (2019.02); *B29C 48/914* (2019.02); *B29K 2823/065* (2013.01);
(Continued)

(58) Field of Classification Search
CPC ....................................................... B29C 41/26
See application file for complete search history.

(56) References Cited

U.S. PATENT DOCUMENTS 3,159,696 A    12/1964   Hodgson, Jr.
3,231,653 A    1/1966    Goldman
(Continued)

FOREIGN PATENT DOCUMENTS

BR    0510085 B1    1/2016
CA    2802583 A1    12/2010
(Continued)

OTHER PUBLICATIONS

Tegethoff, E. Wolfgang, Calcium Carbonate From the Cretaceous Period into the 21 st Century, p. 310,2001, Springer Basel AG, Germany.
(Continued)

*Primary Examiner* — Galen H Hauth
(74) *Attorney, Agent, or Firm* — Barnes & Thornburg LLP

(57) ABSTRACT

Gas-permeable barrier films include a polyolefin and an inorganic filler dispersed in the polyolefin. Methods for forming polymeric films and articles of manufacture prepared therefrom are described.

24 Claims, 7 Drawing Sheets

(51) Int. Cl.
  *B29C 48/08* (2019.01)
  *B29C 48/305* (2019.01)
  *B29C 48/88* (2019.01)
  *B29C 48/21* (2019.01)
  *B29C 48/35* (2019.01)
  *B29C 39/02* (2006.01)
  *B29C 48/10* (2019.01)
  *B29L 7/00* (2006.01)

(52) U.S. Cl.
  CPC .............. *B29K 2823/0633* (2013.01); *B29K 2995/0065* (2013.01); *B29L 2007/00* (2013.01)

(56) References Cited

U.S. PATENT DOCUMENTS

| | | |
|---|---|---|
| 3,325,575 A | 6/1967 | Marshall |
| 3,347,962 A | 10/1967 | Dieck |
| 3,520,964 A * | 7/1970 | Metz, Jr. ............. B29C 47/0021 264/216 |
| 3,676,242 A | 7/1972 | Prentice |
| 3,694,537 A | 9/1972 | Fairbanks |
| 3,745,057 A | 7/1973 | Loft et al. |
| 3,796,785 A | 3/1974 | Rest |
| 3,816,886 A | 6/1974 | Van Cappellen |
| 3,843,761 A | 10/1974 | Bierenbaum et al. |
| 3,849,241 A | 11/1974 | Butin |
| 3,894,904 A | 7/1975 | Cook |
| 4,066,729 A | 1/1978 | Van Cappellen |
| 4,093,695 A | 6/1978 | Heirbaut |
| 4,120,928 A | 10/1978 | Furukawa |
| 4,235,579 A | 11/1980 | Batson |
| 4,275,105 A | 6/1981 | Boyd |
| 4,310,485 A | 1/1982 | Dauber |
| 4,436,888 A | 3/1984 | Copple |
| 4,472,328 A | 9/1984 | Sugimoto |
| 4,632,869 A | 12/1986 | Park |
| 4,636,869 A | 1/1987 | Tomohisa |
| 4,668,463 A | 5/1987 | Cancio |
| 4,704,238 A | 11/1987 | Okuyama |
| 4,758,462 A | 7/1988 | Park |
| 4,777,073 A | 10/1988 | Sheth |
| 4,808,359 A | 2/1989 | Van Der Molen |
| 4,842,907 A | 6/1989 | VanErden |
| 4,874,567 A | 10/1989 | Lopatin |
| 4,929,303 A | 5/1990 | Sheth |
| 4,931,003 A | 6/1990 | VanErden |
| 5,028,289 A | 7/1991 | Rasmussen |
| 5,073,617 A | 12/1991 | Jorge |
| 5,076,977 A | 12/1991 | Maier |
| 5,110,530 A | 5/1992 | Havens |
| 5,164,258 A | 11/1992 | Shida |
| 5,176,953 A | 1/1993 | Jacoby |
| 5,192,606 A | 3/1993 | Proxmire |
| 5,208,098 A | 5/1993 | Stover |
| 5,234,423 A | 8/1993 | Alemany |
| 5,244,724 A | 9/1993 | Antonacci |
| 5,261,899 A | 11/1993 | Visscher |
| 5,445,862 A | 8/1995 | Kaneko |
| 5,508,072 A | 4/1996 | Andersen |
| 5,558,930 A | 9/1996 | Dipoto |
| 5,560,974 A | 10/1996 | Langley |
| 5,709,932 A | 1/1998 | Glez |
| 5,728,451 A | 3/1998 | Langley |
| 5,756,169 A | 5/1998 | Peiffer |
| 5,814,178 A | 9/1998 | Jacobs |
| 5,843,056 A | 12/1998 | Good |
| 5,843,057 A | 12/1998 | McCormack |
| 5,910,136 A | 6/1999 | Hetzler |
| 5,932,497 A | 8/1999 | Morman |
| 6,033,771 A | 3/2000 | Heffelfinger |
| 6,037,281 A | 3/2000 | Mathis |
| 6,045,900 A | 4/2000 | Haffner |
| 6,075,179 A | 6/2000 | McCormack |
| 6,156,421 A | 12/2000 | Stopper |
| 6,245,271 B1 | 6/2001 | Jacobs et al. |
| 6,277,479 B1 | 8/2001 | Campbell |
| 6,309,736 B1 | 10/2001 | McCormack et al. |
| H2000 H * | 11/2001 | Middlesworth ....... B29C 55/005 156/244.11 |
| 6,375,781 B1 | 4/2002 | Wojcik |
| 6,488,801 B1 | 12/2002 | Bodaghi |
| 6,509,513 B2 | 1/2003 | Glaug |
| 6,575,726 B1 | 6/2003 | Nissel |
| 6,638,636 B2 | 10/2003 | Tucker |
| 6,649,548 B1 | 11/2003 | Shawver |
| 6,653,523 B1 | 11/2003 | McCormack |
| 6,676,871 B1 | 1/2004 | Benassi |
| 6,767,622 B2 | 7/2004 | Hada |
| 6,909,028 B1 | 6/2005 | Shawver |
| 6,991,758 B2 | 1/2006 | Krumm |
| 7,307,031 B2 | 12/2007 | Carroll |
| 7,501,363 B2 | 3/2009 | Dharmadhikary |
| 7,510,758 B2 | 3/2009 | Painumoottil |
| 7,776,771 B2 | 8/2010 | Autran |
| 7,833,211 B2 | 11/2010 | Mansfield |
| 7,879,452 B2 | 2/2011 | Muslet |
| 8,067,501 B2 | 11/2011 | Fiscus |
| 8,092,731 B2 | 1/2012 | Guenanten |
| 8,163,216 B2 | 4/2012 | Boermann |
| 8,298,630 B2 | 10/2012 | Nitta |
| 8,383,246 B2 | 2/2013 | Frauenhofer |
| 8,445,744 B2 | 5/2013 | Autran |
| 8,603,609 B2 | 12/2013 | Fraser |
| 8,734,016 B2 | 5/2014 | Borchardt |
| 8,794,835 B2 | 8/2014 | Wilcoxen |
| 8,865,289 B2 | 10/2014 | Borchardt |
| 8,865,294 B2 | 10/2014 | Cisek |
| 8,876,382 B2 | 11/2014 | Wilcoxen |
| 8,888,365 B2 | 11/2014 | Fraser |
| 8,937,211 B2 | 1/2015 | Dent |
| 8,940,377 B2 | 1/2015 | Fraser |
| 9,016,945 B2 | 4/2015 | Fraser |
| 9,028,386 B2 | 5/2015 | Fraser |
| 9,050,783 B2 | 6/2015 | Borchardt |
| 9,108,390 B2 | 8/2015 | Borchardt |
| 9,114,596 B2 | 8/2015 | MacPherson |
| 9,132,956 B2 | 9/2015 | Wilcoxen |
| 9,169,366 B2 | 10/2015 | Weisman |
| 9,186,862 B2 | 11/2015 | Broering |
| 9,216,538 B2 | 12/2015 | Borchardt |
| D748,990 S | 2/2016 | Broering |
| 9,260,224 B2 | 2/2016 | Borchardt |
| D750,404 S | 3/2016 | Broering |
| D750,499 S | 3/2016 | Broering |
| 9,365,324 B2 | 6/2016 | Wilcoxen |
| 9,381,697 B2 | 7/2016 | Dorsey |
| 9,381,718 B2 | 7/2016 | Dorsey |
| 9,387,618 B2 | 7/2016 | Borchardt |
| 9,393,757 B2 | 7/2016 | Borchardt |
| D762,483 S | 8/2016 | Broering |
| 9,469,441 B2 | 10/2016 | Borchardt |
| 9,469,443 B2 | 10/2016 | Hoying |
| 9,486,977 B2 | 11/2016 | Broering |
| 9,492,332 B2 | 11/2016 | Cancio |
| 9,522,498 B2 | 12/2016 | Borchardt |
| 9,522,768 B2 | 12/2016 | Wilcoxen |
| 9,566,760 B2 | 2/2017 | Borchardt |
| 9,573,729 B2 | 2/2017 | Cobler |
| 9,604,429 B2 | 3/2017 | Borchardt |
| 9,637,278 B2 | 5/2017 | Borchardt |
| 9,669,595 B2 | 6/2017 | Borchardt |
| 9,682,801 B2 | 6/2017 | Borchardt |
| 9,731,475 B2 | 8/2017 | Wilcoxen |
| 9,744,706 B2 | 8/2017 | Borchardt |
| 9,790,012 B2 | 10/2017 | Bergman |
| 9,862,177 B2 | 1/2018 | MacPherson |
| D811,895 S | 3/2018 | Borchardt |
| D811,897 S | 3/2018 | Cisek |
| D811,898 S | 3/2018 | Pszczolkowski |
| D811,899 S | 3/2018 | Kuhl |
| D811,900 S | 3/2018 | Borchardt |
| D812,492 S | 3/2018 | Cisek et al. |
| D813,054 S | 3/2018 | Pszczolkowski |

(56) References Cited

U.S. PATENT DOCUMENTS

| | | | |
|---|---|---|---|
| D814,940 S | 4/2018 | Pszczolkowski | |
| D815,958 S | 4/2018 | Borchardt | |
| 9,950,489 B2 | 4/2018 | Fraser | |
| 9,950,841 B2 | 4/2018 | Fraser | |
| D817,779 S | 5/2018 | Pszczolkowski | |
| 9,981,456 B2 | 5/2018 | Broering | |
| 10,029,437 B2 | 7/2018 | Borchardt | |
| 10,046,508 B2 | 8/2018 | Dorsey | |
| 10,052,844 B2 | 8/2018 | Dorsey | |
| 10,081,169 B2 | 9/2018 | Broering | |
| 10,167,165 B2 | 1/2019 | Binger | |
| 10,196,176 B2 | 2/2019 | Fraser | |
| 10,196,177 B2 | 2/2019 | Borchardt | |
| D842,706 S | 3/2019 | Pszczolkowski | |
| 10,398,605 B2 | 9/2019 | Cancio | |
| 10,398,606 B2 | 9/2019 | Cancio | |
| 10,500,107 B2 | 12/2019 | Autran | |
| 2002/0074691 A1 | 6/2002 | Mortellite | |
| 2002/0187361 A1 | 12/2002 | Amon | |
| 2003/0021925 A1 | 1/2003 | Schmal | |
| 2003/0035943 A1 | 2/2003 | Jones | |
| 2003/0039851 A1* | 2/2003 | Hale | B32B 27/08 428/480 |
| 2003/0045844 A1 | 3/2003 | Taylor | |
| 2003/0077471 A1 | 4/2003 | Tucker | |
| 2003/0082392 A1 | 5/2003 | Bader | |
| 2003/0161995 A1 | 8/2003 | Kauschke | |
| 2003/0168776 A1* | 9/2003 | Brady | A61F 13/51462 264/284 |
| 2004/0015142 A1 | 1/2004 | Johnston | |
| 2004/0122398 A1 | 6/2004 | Schnabel | |
| 2004/0157333 A1 | 8/2004 | McAmish | |
| 2004/0209070 A1 | 10/2004 | Sheppard | |
| 2005/0086465 A1 | 4/2005 | Sapkota | |
| 2005/0110713 A1 | 5/2005 | Chung | |
| 2005/0245162 A1 | 11/2005 | McCormack | |
| 2006/0016359 A1 | 1/2006 | Ford | |
| 2006/0024518 A1 | 2/2006 | Kong | |
| 2006/0024520 A1 | 2/2006 | Kong | |
| 2006/0147716 A1 | 7/2006 | Braverman | |
| 2006/0148361 A1 | 7/2006 | Ng | |
| 2006/0151914 A1 | 7/2006 | Gerndt | |
| 2006/0172102 A1 | 8/2006 | Busch | |
| 2006/0228504 A1 | 10/2006 | Wilkie | |
| 2006/0269710 A1 | 11/2006 | Inglis | |
| 2007/0020448 A1 | 1/2007 | Hubbard | |
| 2007/0056899 A1 | 3/2007 | Hakanson | |
| 2007/0237924 A1 | 10/2007 | Bruce | |
| 2007/0267774 A1 | 11/2007 | Ueda | |
| 2008/0147034 A1 | 6/2008 | Wang | |
| 2008/0205800 A1 | 8/2008 | Su | |
| 2008/0233375 A1 | 9/2008 | Wright | |
| 2009/0233024 A1 | 9/2009 | Ballard | |
| 2009/0252902 A1 | 10/2009 | Bender | |
| 2009/0273110 A1 | 11/2009 | Sun | |
| 2009/0286098 A1 | 11/2009 | Yajima | |
| 2009/0311493 A1 | 12/2009 | Manabe | |
| 2010/0022764 A1 | 1/2010 | Otoshi | |
| 2010/0040875 A1 | 2/2010 | Patel | |
| 2010/0076390 A1 | 3/2010 | Norrby | |
| 2010/0078849 A1 | 4/2010 | Noritsune | |
| 2010/0078850 A1 | 4/2010 | Noritsune | |
| 2010/0098354 A1 | 4/2010 | Fraser | |
| 2010/0113653 A1 | 5/2010 | Ueda | |
| 2010/0168409 A1 | 7/2010 | Fujita | |
| 2010/0179263 A1 | 7/2010 | Heki | |
| 2010/0184939 A1 | 7/2010 | Otoshi | |
| 2010/0209640 A1 | 8/2010 | Yun | |
| 2010/0216963 A1 | 8/2010 | Ueda | |
| 2011/0018149 A1 | 1/2011 | Kazama | |
| 2011/0033689 A1 | 2/2011 | Ivan | |
| 2011/0052104 A1 | 3/2011 | Wilcoxen | |
| 2011/0052105 A1 | 3/2011 | Wilcoxen | |
| 2011/0117307 A1 | 5/2011 | Fraser | |
| 2011/0195259 A1 | 8/2011 | Song | |
| 2011/0218316 A1 | 9/2011 | Drysdale | |
| 2011/0274892 A1 | 11/2011 | Chang | |
| 2011/0282313 A1 | 11/2011 | Lu | |
| 2012/0012633 A1 | 1/2012 | Wilcoxen | |
| 2012/0033900 A1 | 2/2012 | Fraser | |
| 2012/0039550 A1 | 2/2012 | MacPherson | |
| 2012/0063704 A1 | 3/2012 | Hoying | |
| 2012/0063706 A1 | 3/2012 | Fraser | |
| 2012/0064271 A1 | 3/2012 | Broering | |
| 2012/0077113 A1 | 3/2012 | Kim | |
| 2012/0088645 A1 | 4/2012 | Fraser | |
| 2012/0134606 A1 | 5/2012 | Borchardt | |
| 2012/0135256 A1 | 5/2012 | Donovan | |
| 2012/0150137 A1 | 6/2012 | Wang | |
| 2012/0163738 A1 | 6/2012 | Borchardt | |
| 2012/0214657 A1 | 8/2012 | Fraser | |
| 2012/0217682 A1 | 8/2012 | Vignola | |
| 2012/0237743 A1 | 9/2012 | O'Donnell | |
| 2012/0237746 A1 | 9/2012 | O'Donnell | |
| 2012/0258307 A1 | 10/2012 | Cretekos | |
| 2012/0269465 A1 | 10/2012 | Dorsey | |
| 2012/0269466 A1 | 10/2012 | Dorsey | |
| 2012/0282476 A1 | 11/2012 | Lu | |
| 2012/0308789 A1 | 12/2012 | Lockhart | |
| 2013/0011631 A1 | 1/2013 | Sakellarides | |
| 2013/0028542 A1 | 1/2013 | Borchardt | |
| 2013/0029066 A1 | 1/2013 | Borchardt | |
| 2013/0041335 A1 | 2/2013 | Dwiggins | |
| 2013/0046069 A1 | 2/2013 | Meyer | |
| 2013/0086874 A1 | 4/2013 | Liestman | |
| 2013/0094788 A1 | 4/2013 | Wilcoxen | |
| 2013/0099413 A1* | 4/2013 | Inazawa | B29C 48/08 264/211.12 |
| 2013/0115396 A1 | 5/2013 | Borchardt | |
| 2013/0140207 A1 | 6/2013 | Wilcoxen | |
| 2013/0202853 A1 | 8/2013 | Bergman | |
| 2013/0209711 A1 | 8/2013 | Borchardt | |
| 2013/0209712 A1 | 8/2013 | Borchardt | |
| 2013/0243982 A1 | 9/2013 | Borchardt | |
| 2013/0259408 A1 | 10/2013 | Borchardt | |
| 2013/0295395 A1 | 11/2013 | Paulino | |
| 2013/0323487 A1 | 12/2013 | Takahashi | |
| 2014/0023829 A1 | 1/2014 | Broering | |
| 2014/0119679 A1 | 5/2014 | Cisek | |
| 2014/0174631 A1 | 6/2014 | Borchardt | |
| 2014/0178649 A1 | 6/2014 | Borchardt | |
| 2014/0248484 A1 | 9/2014 | Börmann et al. | |
| 2014/0334749 A1 | 11/2014 | Borchardt | |
| 2014/0367885 A1 | 12/2014 | Borchardt | |
| 2014/0378286 A1 | 12/2014 | Borchardt | |
| 2015/0003757 A1 | 1/2015 | Wilcoxen | |
| 2015/0010251 A1 | 1/2015 | Wilcoxen | |
| 2015/0030266 A1 | 1/2015 | Borchardt | |
| 2015/0036951 A1 | 2/2015 | Fraser | |
| 2015/0071574 A1 | 3/2015 | Fraser | |
| 2015/0190979 A1 | 7/2015 | Fraser | |
| 2015/0240000 A1 | 8/2015 | Wang | |
| 2015/0298862 A1 | 10/2015 | Borchardt | |
| 2015/0321461 A1 | 11/2015 | MacPherson | |
| 2015/0328058 A1* | 11/2015 | Cancio | B32B 27/205 428/219 |
| 2016/0016751 A1 | 1/2016 | Binger | |
| 2016/0039169 A1 | 2/2016 | Broering | |
| 2016/0046110 A1 | 2/2016 | Broering | |
| 2016/0059471 A1 | 3/2016 | Borchardt | |
| 2016/0067907 A1 | 3/2016 | Borchardt | |
| 2016/0114071 A1 | 4/2016 | Topolkaraev | |
| 2016/0194128 A1 | 7/2016 | Bergman | |
| 2016/0271864 A1 | 9/2016 | Dorsey | |
| 2016/0271902 A1 | 9/2016 | Dorsey | |
| 2016/0361903 A1 | 12/2016 | Bender | |
| 2017/0015821 A1 | 1/2017 | Dou | |
| 2017/0080622 A1 | 3/2017 | Borchardt | |
| 2017/0080623 A1 | 3/2017 | Borchardt | |
| 2017/0305104 A1 | 10/2017 | Wilcoxen | |
| 2017/0312968 A1 | 11/2017 | Ford | |
| 2017/0361566 A1 | 12/2017 | Borchardt | |

(56) References Cited

U.S. PATENT DOCUMENTS

| | | |
|---|---|---|
| 2018/0194099 A1 | 7/2018 | Wilcoxen |
| 2018/0244433 A1 | 8/2018 | Borchardt |
| 2019/0091966 A1 | 3/2019 | Wilcoxen |

FOREIGN PATENT DOCUMENTS

| | | |
|---|---|---|
| CN | 100430221 C | 11/2004 |
| CN | 1976797 | 6/2007 |
| CN | 1976797 A | 6/2007 |
| CN | 1976797 B | 12/2010 |
| CN | 101959907 | 1/2011 |
| CN | 102292056 | 12/2011 |
| CN | 103429430 A | 12/2013 |
| DE | 10352958 | 6/2005 |
| EP | 0283200 | 9/1988 |
| EP | 283200 A2 | 9/1988 |
| EP | 0283200 A2 | 9/1988 |
| EP | 1423275 | 6/2004 |
| EP | 1423275 A1 | 6/2004 |
| EP | 1423275 B1 | 6/2004 |
| EP | 1250225 B1 | 8/2005 |
| EP | 1225861 B1 | 7/2008 |
| JP | 04309546 | 11/1992 |
| JP | 04309546 A | 11/1992 |
| JP | H04335043 | 11/1992 |
| JP | 664080 A | 3/1994 |
| JP | H07016939 | 1/1995 |
| JP | 0959408 A | 3/1997 |
| JP | H0959408 | 3/1997 |
| JP | 2002146070 | 5/2002 |
| JP | 2003039612 | 2/2003 |
| JP | 2003526710 | 9/2003 |
| JP | 2005513960 A | 5/2005 |
| JP | 2005518290 | 6/2005 |
| JP | 2005525247 A | 8/2005 |
| JP | 2006199786 | 8/2006 |
| JP | 2007045046 A | 2/2007 |
| JP | 2007503326 | 2/2007 |
| JP | 2007503326 A | 2/2007 |
| JP | 2007536110 | 12/2007 |
| JP | 2007536110 A | 12/2007 |
| JP | 2011514391 | 5/2011 |
| JP | 2011514391 A | 5/2011 |
| JP | 2017515952 A | 6/2017 |
| KR | 1020070007893 | 1/2007 |
| WO | 9805501 | 2/1998 |
| WO | 9805502 | 2/1998 |
| WO | 9858799 A1 | 12/1998 |
| WO | 9922930 | 5/1999 |
| WO | 9922930 A1 | 5/1999 |
| WO | 9933654 A1 | 7/1999 |
| WO | 0023509 | 4/2000 |
| WO | 0023509 A1 | 4/2000 |
| WO | 2000023509 A1 | 4/2000 |
| WO | 0151548 | 7/2001 |
| WO | 0151548 A2 | 7/2001 |
| WO | 2001047710 | 7/2001 |
| WO | 2001047710 A1 | 7/2001 |
| WO | 0158685 A1 | 8/2001 |
| WO | 2001058685 A1 | 8/2001 |
| WO | 03020513 A1 | 3/2003 |
| WO | 03035394 A1 | 5/2003 |
| WO | 2003035394 A1 | 5/2003 |
| WO | 03072338 A1 | 9/2003 |
| WO | 2005021262 | 3/2005 |
| WO | 2005021262 A1 | 3/2005 |
| WO | 2005110713 | 11/2005 |
| WO | 2005110713 A1 | 11/2005 |
| WO | 2007022990 | 3/2007 |
| WO | 2009094506 A1 | 7/2009 |
| WO | 2010059448 A1 | 5/2010 |
| WO | 2011019504 | 2/2011 |
| WO | 2014199268 A1 | 12/2014 |
| WO | 2015175593 | 11/2015 |
| WO | 2015175593 A1 | 11/2015 |
| WO | 2017011341 A1 | 1/2017 |

OTHER PUBLICATIONS

Gregory, B. H., Polyethylene Film Extrusion a Process Manual, pp. 102-103,215,2009, Trafford Publishing, USA.

Third-Party Submission in U.S. Appl. No. 15/206,072 submitted May 30, 2017, BP-480 II, 25 pages.

International Search Report and Written Opinion dated May 8, 2017, BP-496 PCT II, 12 pages.

International (PCT) Search Report for PCT/US17/19594 dated May 30, 2017, BP-495 PCT II, 8 pages.

Indonesian Office Action for Indonesian Patent App. No. P-00201607612 received on Dec. 21, 2018, CLP-14009 ID II, 5 pages.

Office Action dated Jan. 15, 2019 for U.S. Appl. No. 15/206,072, BP-480 US-U II, (pp. 1-13).

Chinese Decision of Rejection for Chinese App. No. 2015800270287 dated Oct. 11, 2018, CLP-14009 CN II, 4 pages, (no English translation available).

English Translation of Chinese Decision of Rejection for Chinese App. No. 2015800270287 dated Oct. 11, 2018, CLP-14009 CN II, 6 pages.

Columbian Office Action for Columbian App. No. NC2018/0000374 dated Jan. 31, 2018, BP-480 CO II, 7 pages.

P.C. Wu et al., "Novel Microporous Films and their Composites," Journal of Engineered Fibers and Fabrics, vol. 2, Issue 1, 2007, 11 pages.

Omya International AG, Breathable Polyolefin Film, Review, Technical Information Plastics, R4-02, 2004, 4 pages.

D.L. Green et al., "Three-dimensional Pore Connectivity in Bi-axially Stretched Microporous Composite Membranes," Journal of Membrane Science, 279, 100-110, 2006, 11 pages.

International (PCT) Search Report and Written Opinion for PCT App. No PCT/US16/60006 dated Mar. 29, 2017, BP-485 PCT II, 17 pages.

Office Action dated Nov. 30, 2017 for U.S. Appl. No. 15/341,103; (pp. 1-9).

CN, Second Office Action of State Intellectual Property Office (with English translation), Chinese Patent Application No. 2015800270287, 9 pages, dated Jan. 30, 2018.

Windmolier & Holscher Technical Data Sheet (2013), 2 pages.

U.S. Non-Final Office Action, U.S. Appl. No. 14/709,728, 17 pages (dated Apr. 22, 2016).

Admitted Prior Art—Product Data Sheet BR 124 (Clopay), 2 pages.

English Translation of Office Action dated Jun. 5, 2017 issued in corresponding Chinese Patent Application No. 201580027028.7.

CN, English Translation of Search Report issued in corresponding Chinese Patent Application No. 2015800270287, 2 pages (dated May 26, 2017).

CN, Office Action, Chinese Application No. 2015800280287, 5 pages (dated Jun. 5, 2017).

U.S. Non-Final Office Action issued in parent U.S. Appl. No. 14/709,728, 17 pages (dated Apr. 22, 2016).

CO, English Translation of Office Action issued in corresponding Colombian Patent Application No. NC2016/0004872, 1 page (dated Dec. 24, 2016).

Office Action dated Jul. 25, 2018 for U.S. Appl. No. 15/341,103, BP-485 US-U II, (pp. 1-12).

Extended European Search Report for European Pat. App. No. 18159121.5 dated Jun. 26, 2018, CLP-14009 EP II, 11 pages.

Communication Pursuant to Article 94(3) EPC for European Patent App. No. 15724480.7 dated Jun. 18, 2018, 6 pages.

Office Action dated Dec. 11, 2018 for U.S. Appl. No. 15/341,103, BP-485 US-U II, (pp. 1-21).

Office Action dated Dec. 11, 2018 for U.S. Appl. No. 15/442,867, BP-495 US-U II, (pp. 1-8).

Japanese Office Action for Japanese App. No. 2016-567675 dated Nov. 19, 2018, CLP-14009 JP II, 11 pages.

Office Action dated May 17, 2019 for U.S. Appl. No. 15/206,072, BP-480 US-U II(pp. 1-12).

(56) References Cited

OTHER PUBLICATIONS

Canadian Office Action for Canadian App. No. 3,004,264 dated Apr. 9, 2019, BP-485 CA ||, 8 pages.
Japanese Office Action for Japanese App. No. 2018-522690 dated May 26, 2019, BP-485 JP ||, 14 pages.
Japanese Office Action for Japanese App. No. 2016-567675 dated Jul. 22, 2019, CLP-14009 JP ||, 11 pages.
Australian Examination Report for Australian App. No. 2015259236 dated Feb. 26, 2019, CLP-14009 AU ||. 3 pages.
Korean Preliminary Rejection for Korean App. No 10-2016-7034770 dated Jan. 21, 2019, CLP-14009 ||, 15 pages.
European Extended Search Report for EP16824959.7 dated Feb. 19, 2019, BP-480 EP ||, 8 pages.
Notice of Decision for Egyptian App. No. 1816/2016 received on Jan. 30, 2019, CLP-14009 EG ||, 13 pages.
Office Action dated Feb. 14, 2019 for U.S. Appl. No. 15/876,483, CLP-14009 US-CON || (p. 1-9).
Australian First Examination Report for Australian App. No 2016350820 dated May 24, 2019, BP-485 AU ||, 6 pages.
Office Action dated Jun. 5, 2019 for U.S. Appl. No. 15/442,867, BP-495 US-U ||, 8 pages.
Columbian Office Action for Columbian App. No. NC2018/0000374 dated May 3, 2019, BP-480 CO ||, 35 pages.
Korean Office Action for Korean App. No. 10-2018-7015313 dated Jun. 25, 2019, BP-485 KR ||, 33 pages.
Notice of Final Rejection for Korean App. No 10-2016-7034770 received on Aug. 5, 2019, CLP-14009 ||, 7 pages.
Office Action dated Aug. 23, 2019 for U.S. Appl. No. 15/206,072, BP-480 US-U ||, (pp. 1-16).
Notice of Opposition for AU2015259236 sent Aug. 27, 2019, CLP-14009 AU ||, 3 pages.
Office Action dated Sep. 10, 2019 for U.S. Appl. No. 15/341,103 (pp. 1-15).
Columbian Office Action for Columbian App. No. NC2018/0000374 dated Sep. 24, 2019, BP-480 CO ||, 26 pages.
Columbian Office Action for Columbian App. No. NC2018/0000374 dated Nov. 5, 2019, BP-480 CO ||, 31 pages.
European Communication pursuant to Art. 94(3) for EP16824959.7 dated Oct. 10, 2019, BP-480 EP ||, 4 pages.
Notice of Preliminary Rejection for Korean App. No. 10-2016-7034770 received on Nov. 28, 2019, CLP-14009 KR ||, 5 pages.
Columbian Office Action for Columbian App. No. NC2018/0004912 dated Jan. 29, 2020, BP-480 CO ||, 30 pages.
Statement of Grounds & Particulars of Opposition for Australian App. No. 2015259236 sent Nov. 22, 2019, 4 pages.
Evidence in Support of the Opposition for Australian App. No. 2015259236, 505 pages.
Korean Final Office Action for Korean App. No. 10-2018-7015313 dated Mar. 5, 2020, BP-485 KR ||, 10 pages.
Japanese Office Action for Japanese App. No. 2018-522690 dated Jan. 30, 2020, BP-485 JP||, 9 pages.
Brazilian Preliminary Examination Report for Brazilian Patent App. No. BR112018008995-8, dated Feb. 28, 2020, BP-485 BR ||, 5 pages, (No English Translation available).
Indian First Examination Report for Indian App. No. 201627041571, dated Feb. 20, 2020, CLP-14009 IN ||, 5 pages.
Chinese Reexamination Decision for Chinese App. No. 2015800270287 dated May 8, 2020, CLP-14009 CN ||, 7 pages, (no English translation available).
Brazilian Preliminary Examination Report for Brazilian Patent App. No. BR112018000507-0 dated May 12, 2020, BP-480 BR ||, 4 pages, (No English Translation).
English Translation of Chinese Reexamination Decision for Chinese App. No. 2015800270287 dated May 8, 2020, CLP-14009 CN ||, 8 pages.
Chinese Office Action for Chinese App. No. 201680047601.5 dated May 27, 2020, BP-480 CN ||, 8 pages.
Office Action dated May 21, 2020 for U.S. Appl. No. 15/700,282 (pp. 1-8).
Australian Examination Report for Australian App. No. 2016293826 dated Mar. 31, 2020, BP-480 AU ||, 3 pages.
Office Action dated Apr. 6, 2020, for U.S. Appl. No. 15/206,072, BP-480 US-U || (pp. 1-25).
Korean Final Office Action for Korean App. No. 10-2018-7015313 dated Dec. 23, 2019, BP-485 KR ||, 10 pages.
Chinese Patent Office Action for Chinese App. No. 201680077856.6 dated Dec. 4, 2019, BP-485 CN ||, 34 pages.
Office Action dated Jan. 15, 2020 for U.S. Appl. No. 15/700,282, CLP-14009 US-REI || (pp. 1-7).
Australian Examination Report for Australian App. No 2016350820 dated Jan. 8, 2020, BP-485 AU ||, 4 pages.
Saudi Arabian First Examination Report for Saudi Arabian App. No 516380252, received on Jan. 28, 2020, CLP-14009 SA ||, 8 pages.
Office Action dated Feb. 4, 2020 for U.S. Appl. No. 15/442,867 (pp. 1-9).
Brazilian Search Report for Brazilian Patent App. BR112016025367-1 dated Dec. 5, 2019, CLP-14009 BR ||, 9 pages.
Office Action dated Dec. 19, 2019 for U.S. Appl. No. 15/341,103, BP-485 US-U ||, 17 pages.
Canadian Office Action for Canadian Patent App. No. 3,004,264 dated Nov. 8, 2019, BP-485 CA ||, 3 pages.
Indian First Examination Report for Indian Patent App. No. 201817001177 dated Aug. 24, 2020, BP-480 IN ||, 9 pages.
Office Action dated Aug. 28, 2020 for U.S. Appl. No. 15/206,072, BP-480 US-U || (pp. 1-26).
Indian Hearing Notice for Indian App. No. 201627041571, dated Sep. 4, 2020, CLP-14009 IN ||, 2 pages.
European Communication pursuant to Art. 94(3) for EP16824959.7 dated Jun. 3, 2020, BP-480 EP ||, 11 pages.
Notice of Acceptance for Australian App. No. 2016350820 dated Jun. 5, 2020, BP-485 AU ||, 3 pages.
Notice of Reasons for Refusal for Japanese App. No 2018-521194 dated Jun. 30, 2020, BP-480 JP ||, 27 pages.
Notice of Decision for Egyptian App. No 1816/2016 received on Jun. 28, 2020, CLP-14009 EG ||, 13 pages.
Office Action dated Aug. 3, 2020 for U.S. Appl. No. 15/442,867 (pp. 1-10).
Second Chinese Office Action for Chinese App. No. 201680077856.6 dated Jul. 21, 2020, BP-485 CN ||, 23 pages.
Redacted Declaration of Robert Koplin as part of Evidence in Reply for Opposition of Australian App. No. 2015259236, 84 pages.
European Examination Report for European App. No. 16862828.7 dated Oct. 21, 2020, BP-485 EP ||, 5 pages.
Evidence in Reply for Opposition of Australian App. No. 2015259236, 254 pages.
SML, 100% Extrustion Cast Film Lines: Hygiene Film Brochure, Oct. 2013, 28 pages.
SML, Innovation Days Invitation, Nov. 13-15, 2012, 2 pages.
Chinese Decision of Reexamination for Chinese App. No. 2015800270287 dated Oct. 12, 2020, CLP-14009 CN ||, 25 pages.
European Communication pursuant to Art. 94(3) for EP16824959.7 dated Nov. 4, 2020, BP-480 EP ||, 6 pages.
Decision of Refusal for Japanese App. No. 2018-521194 dated Nov. 4, 2020, BP-480 JP ||, 18 pages.
Chinese Office Action for Chinese Patent App. No. 2019100617856 dated Feb. 5, 2021, CLP-14009 CN-DIV1 ||, 16 pages.
Giles et al., "Extrusion: The Definitive Processing Guide and Handbook" 2005, 517 pages.
Ren et al., "Different Dependence of Tear Strenth on Film Orientation of LLDPE Made with Different Co-Monomer" Polymers 2019, 11, 434, 13 pages.
Preliminary Notice of Patent Revocation for Korean Patent No. 10-2108157 dated Jan. 28, 2021, CLP-14009 KR ||, 13 pages.
Israeli Office Action for Israeli App. No. 256811 dated Jan. 25, 2021, BP-480 ||, 10 pages.
Office Action dated Jan. 4, 2021 for U.S. Appl. No. 15/206,072, BP-480 US-U || (pp. 1-30).
Application for Patent Revocation for Korean App. No. 10-2016-7034770 dated Nov. 30, 2020, CLP-14009 KR ||, 209 pages.
Third Chinese Office Action for Chinese App. No. 201680047601.5 dated Jun. 11, 2021, BP-480 CN ||, 12 pages.

(56) References Cited

OTHER PUBLICATIONS

Brazilian Negative Opinion for Brazilian Patent App. BR112016025367-1 dated Apr. 7, 2021, CLP-14009 BR ∥, 23 pages.
Rejection Decision for Chinese App. No. 201680077856.6 dated Apr. 12, 2021, BP-485 CN ∥, 17 pages.
Principle, Process and Technology of Polypropylene, edited by Dingyi Hong, p. 556, Sinopec Press, Sep. 2002, 5 pages.
Usage and Maintenance of Plastic Machinery, edited by Xiaozheng Geng, p. 242, China Light Industry Press, Aug. 1998, 9 pages.
Brazilian Search Report for Brazilian Patent App. BR112016025367-1 dated Apr. 2, 2021, CLP-14009 BR ∥, 12 pages.
Second Japanese Office Action for Japanese Patent App. No. 2020-81253 dated Jul. 5, 2021, CLP-14009 JP ∥, 3 pages.
Sharma et al., "Comparison of Different Tearing Test Methods", Indian Journal of Textile Research, vol. 9, Jun. 1984, p. 46-54, 9 pages.
Office Action dated Jul. 12, 2021 for U.S. Appl. No. 15/206,072 (pp. 1-30).
Decision of Rejection for Chinese App. No. 201680047601.5 dated Sep. 7, 2021, BP-480 CN ∥, 8 pages.
Second Chinese Office Action for Chinese Patent App. No. 2019100617856 dated Oct. 12, 2021, CLP-14009 CN-DIV1 ∥, 8 pages.
Chinese Office Action for Chinese App. No. 201680047601.5 dated Feb. 20, 2021, BP-480 CN ∥, 12 pages.
Japanese Office Action for Japanese Patent App. No. 2020-81253 dated Feb. 8, 2021, CLP-14009 JP ∥, 8 pages.
English Translation of the Chinese Office Action and Search Report for Chinese Patent App. No. 2019100617856 dated Feb. 5, 2021, CLP-14009 CN-DIV1 ∥, 21 pages.
PR-Newswire, "Olefinic Block Copolymer (OBC) Market Anticipated to Grow at a CAGR of 10% by 2025" Aug. 14, 2018, available at https://markets.businessinsider.com/news/stocks/olefin-derivatives-global-markets-to-2022-1027328410, 10 pages.
Qenos, "Film Extrusion and Conversion Technical Guide" publication date unknown, 64 pages.
Qenos, "Extrusion Coating & Lamination Technical Guide" publication date unknown, 24 pages.
English Translation of the Second Chinese Office Action and Search Report for Chinese Patent App. No. 2019100617856 dated Feb. 5, 2021, CLP-14009 CN-DIV1 ∥, 21 pages.
Korean Office Action for Korean Patent Application 10-2020-7009878 dated Nov. 11, 2021, BP-485 KR-DIV1 ∥, 4 pages, English summary included.
Second Columbian Office Action for Columbian App. No. NC2018/0000374 dated Jul. 29, 2021, BP-480 CO ∥, 21 pages.
Opponents Outline of Written Submission for Australian Patent Application No. 2015259236 submitted Aug. 31, 2021, 10 pages.
Brazilian Negative Opinion for Brazilian Patent App. BR122018004413-6 dated Jul. 19, 2021, CLP-14009 BR-DIV1 ∥, 23 pages.
European Examination Report for EP15724480.7 dated Sep. 30, 2021, CLP-14009 EP ∥, 5 pages.
IPTAB Decision on Patent Revocation dated Nov. 24, 2021, CLP-14009 KR ∥, 60 pages, (No English Translation available).
European Communication pursuant to Art. 94(3) for EP16824959.7 dated Nov. 11, 2021, BP-480 EP ∥, 6 pages.
Third Columbian Office Action for Columbian App. No. NC2018/0000374 dated Nov. 25, 2021, BP-480 CO ∥, 21 pages.
K. Aniunoh, "An Experimental and Numerical Study of the Film Casting Process," Clemson University, TigerPrints, Dec. 2007, 238 pages.
Second European Examination Report for EP18159121.5 dated Dec. 3, 2021, CLP-14009 EP-DIV ∥, 4 pages.
Office Action (Final Rejection) dated Jan. 10, 2022 for U.S. Appl. No. 15/206,072 (pp. 1-32).

Indian First Examination Report for Indian Patent App. No. 202118004543 dated Feb. 18, 2022, BP-480 IN-DIV1 ∥, 7 pages.
Korean Preliminary Rejection for Korean Patent App. No. 10-2018-7004084 dated Mar. 3, 2022, BP-480 KR ∥, 22 pages, (English translation included).
Third Japanese Office Action for Japanese Patent App. No. 2020-81253 dated Feb. 21, 2022, CLP-14009 JP ∥, 6 pages.
Office Action (Non-Final Rejection) dated Apr. 5, 2022 for U.S. Appl. No. 15/206,072 (pp. 1-42).
Office Action (Non-Final Rejection) dated Apr. 28, 2022 for U.S. Appl. No. 16/384,295, CLP-14009 US-CON ∥ (pp. 1-8).
Third Columbian Office Action for Columbian App. No. NC2018/0000374 dated Mar. 17, 2022, BP-480 CO ∥, 23 pages.
Brazilian Unfavorable Technical Opinion for Brazilian Patent App. No. BR112018000507-0 dated Jun. 28, 2022, BP-480 BR ∥, 3 pages, (No English Translation).
Nullity Proceeding for Brazilian Patent BR1220180044136 sent Jun. 28, 2022, CLP-14009 BR-DIV1 ∥, 47 pages.
Peruvian Office Action for Peruvian Patent App. No. 000046-2018/DIN dated Jun. 8, 2022, BP-480 PE ∥, 10 pages.
Notice of Reasons for Refusal for Japanese App. No. 2018-521194 dated Jul. 5, 2022, BP-480 JP ∥, 11 pages.
PCT, International Search Report and Written Opinion issued in corresponding International Patent Application No. PCT/US2015/030463; 15 pages (Oct. 2, 2015).
International Search Report and Written Opinion from corresponding PCT application No. PCT/US2015/030463, dated Oct. 5, 2015 (15 pages).
Leo Cancio et al., "The Evolution of Microporous Film," Nonwovens World, pp. 65-70, Oct.-Nov. 2004, 7 pages.
Matt Sonnycalb, "Selecting LLDPE for Down-gauged Films,"AMI Polyethylene Films, Feb. 3, 2015, 21 pages.
First Office Action for Columbian Pat. App. No. NC2018/0004912 received dated Jun. 7, 2018, BP-485 CO ∥5723-277448, 9 pages, (summary in English included).
Columbian Office Action for Colombian Pat. App. No. 2016/0004872 received dated May 28, 2018 date, CLP-14009 CO ∥(5723-278303), 32 pages, (partial English translation available).
Office Action dated Jun. 14, 2018 for U.S. Appl. No. 15/287,119 (pp. 1-9).
Australian Examination Report for Australian App. No. 2015259236 sent Jun. 1, 2018, CLP-14009 AU ∥ 6 pages.
Office Action dated Jun. 20, 2018 for U.S. Appl. No. 15/876,483 (pp. 1-9).
Office Action dated Mar. 26, 2021 for U.S. Appl. No. 15/206,072, BP-480 US-U ∥ (pp. 1-31).
European Examination Report for EP18159121.5 dated Mar. 9, 2021, CLP-14009 EP-DIV ∥, 4 pages.
Office Action dated Mar. 25, 2021 for U.S. Appl. No. 15/442,867, BP-495 US-U ∥ (pp. 1-10).
Office Action dated Mar. 18, 2021 for U.S. Appl. No. 16/222,213, BP-401 US-CON ∥ (pp. 1-17).
Australian Examination Report for Australian App. No. 2019213370 dated Mar. 17, 2021, CLP-14009 AU-DIV1 ∥, 5 pages.
Extended European Search Report for European App. No. 16862828.7 dated Mar. 29, 2019, BP-485 EP ∥, 7 pages.
Office Action dated Apr. 24, 2019 for U.S. Appl. No. 15/341,103, BP-485 US-U ∥, pp. 1-28.
Third European Examination Report for EP18159121.5 dated Aug. 11, 2022, CLP-14009 EP-DIV ∥, 4 pages.
Colombian Denial for Colombian App. No. NC2018/0000374 dated Jul. 29, 2022, BP-480 CO ∥, 19 pages.
Shiromoto. et al, "The effect of viscoelasticity on the extrusion drawing in film-casting process" available from https://www.researchgate.net/publication/238894446_The_effect_of_viscoelasticity_on_the_extrusion_drawing_in_film-casting_process, publushed Apr. 29, 2010, 12 pages.

* cited by examiner

GAS-PERMEABLE BARRIER FILM AND METHOD OF MAKING THE GAS-PERMEABLE BARRIER FILM

PRIORITY CLAIM

This application claims priority under 35 U.S.C. § 119(e) to U.S. Provisional Application Ser. No. 62/296,181, filed Feb. 17, 2016, which is expressly incorporated by reference herein.

BACKGROUND

The present disclosure relates to polymeric materials, and particularly to polymeric films. More particularly, the present disclosure relates to gas-permeable barrier films formed from polymeric material and filler.

SUMMARY

According to the present disclosure, a gas-permeable barrier film is made using a manufacturing process. The manufacturing process comprises the steps of extruding a composition to form a molten web, casting the molten web to form a quenched film, and stretching the quenched film to form the gas-permeable barrier film.

In illustrative embodiments, the composition extruded to form the molten web comprises a polyolefin and an inorganic filler. The quenched film is formed by casting the molten web against a surface of a chill roll, and the quenched film is then stretched.

In illustrative embodiments, a gas-permeable barrier film comprising a polyolefin and an inorganic filler dispersed in the polyolefin has a basis weight of less than about 100 gsm. The gas-permeable barrier film also has a Gurley porosity of less than about 330 seconds.

In illustrative embodiments, a multi-layer gas-permeable barrier film comprises at least one gas-permeable barrier film according to the present disclosure and at least one additional layer.

In illustrative embodiments, a sterilizable package, a garment, and a building material each comprise a gas-permeable barrier film in accordance with the present disclosure.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which.

DETAILED DESCRIPTION

Figure 1:
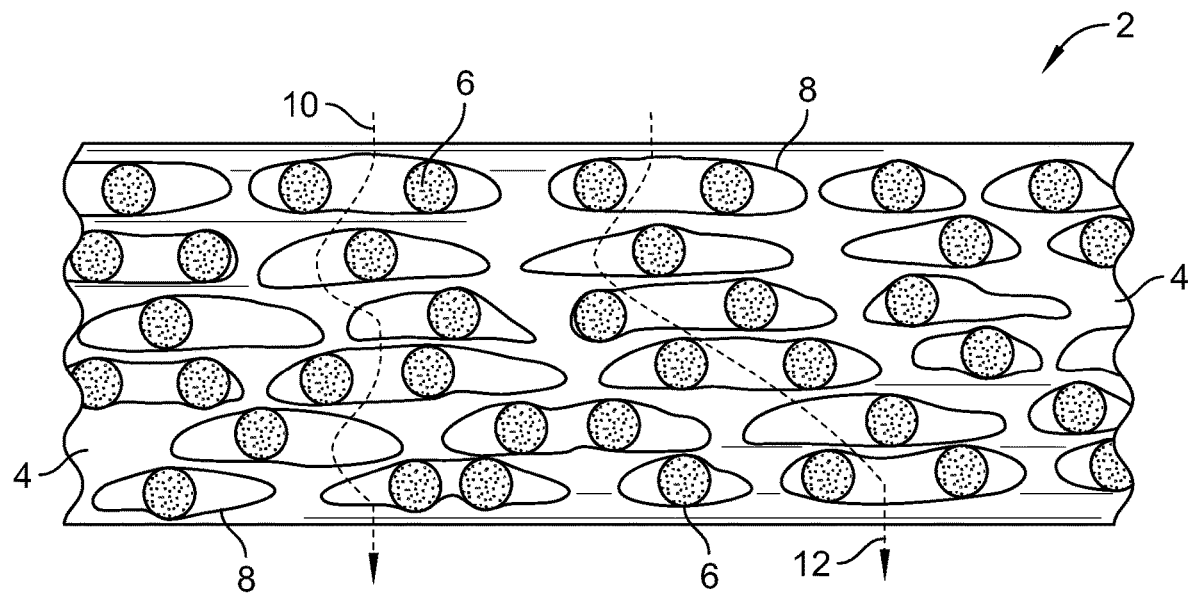
FIG. 1 is a diagrammatic view of a representative embodiment of a gas-permeable barrier film that includes one layer.

A first embodiment of a gas-permeable barrier film 2 in accordance with the present disclosure is shown, for example, in FIG. 1. Gas-permeable barrier film 2 includes a thermoplastic polymer 4 and a solid filler 6 dispersed in the thermoplastic polymer 4. In some embodiments, the gas-permeable barrier film 2 includes a combination of two or more thermoplastic polymers 4 and/or a combination of two or more solid fillers 6. As shown in FIG. 1, the gas-permeable barrier film 2 includes an interconnected network of micropores 8 formed in the thermoplastic polymer resin 4. On average, the micropores 8 are smaller in size than the size of a typical water droplet but larger in size than a water vapor molecule. As a result, the micropores 8 permit the passage of water vapor but minimize or block the passage of liquid water. Two representative pathways for the transmission of water vapor through the gas-permeable barrier film 2 are shown by the dashed lines 10 and 12 in FIG. 1.

A precursor film containing a thermoplastic polymer 4 and a solid filler 6 dispersed in the thermoplastic polymer 4 may be produced by either a cast film process or a blown film process. The film thus produced may then be stretched by one or more stretching processes. The stretching process moves (e.g., pulls) polymeric material away from the surface of solid filler dispersed therein, thereby forming the micropores 8.

Figure 2:
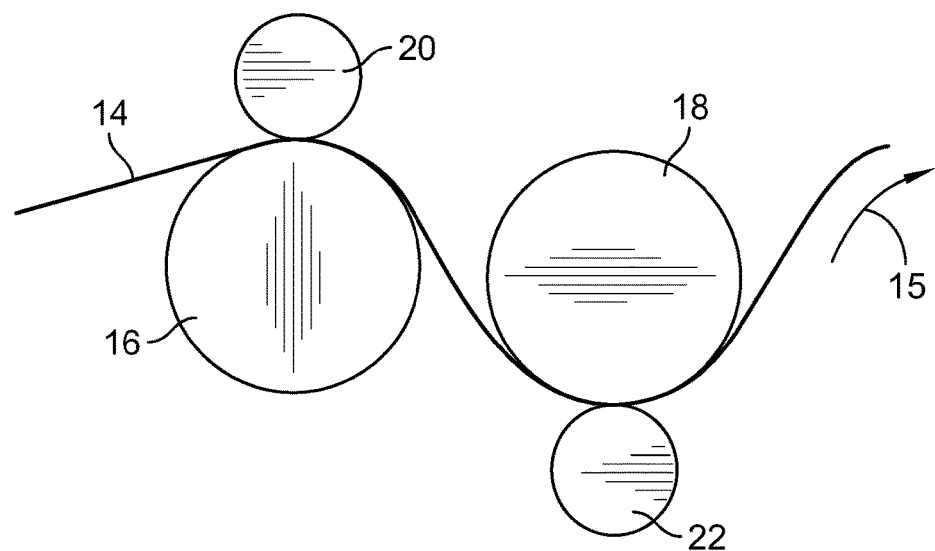
FIG. 2 is a diagrammatic view of an exemplary process for machine direction (MD) stretching of a polymeric film.

In one example, stretching may be achieved via machine direction (MD) stretch by a process analogous to that shown in simplified schematic form in FIG. 2. For example, the film 14 shown in FIG. 2 may be passed between at least two pairs of rollers in the direction of an arrow 15. In this example, first roller 16 and a first nip 20 run at a slower speed ($V_1$) than the speed ($V_2$) of a second roller 18 and a second nip 22. The ratio of $V_2/V_1$ determines the degree to which the film 14 is stretched. Since there may be enough drag on the roll surface to prevent slippage, the process may alternatively be run with the nips open. Thus, in the process shown in FIG. 2, the first nip 20 and the second nip 22 are optional.

Figure 3:
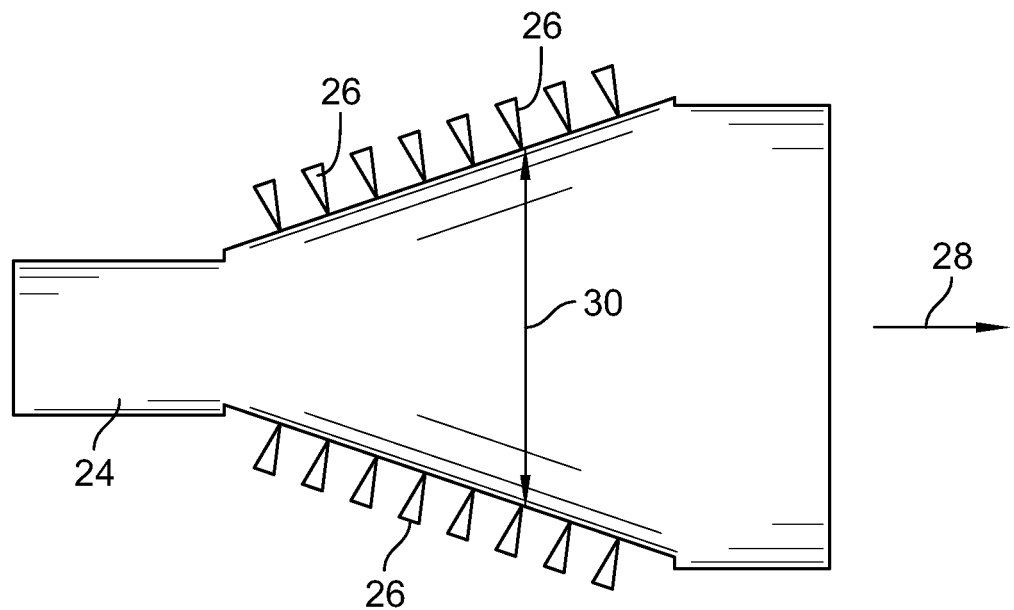
FIG. 3 is a diagrammatic view of an exemplary process for cross-directional (CD) stretching of a polymeric film.

In another example, stretching may be achieved via transverse or cross-directional (CD) stretching by a process analogous to that shown in simplified schematic form in FIG. 3. For example, the film 24 shown in FIG. 3 may be moved in the direction of the arrow 28 while being stretched sideways on a tenter frame in the directions of doubledheaded arrow 30. The tenter frame includes a plurality of attachment mechanisms 26 configured for gripping the film 24 along its side edges.

Figure 4:
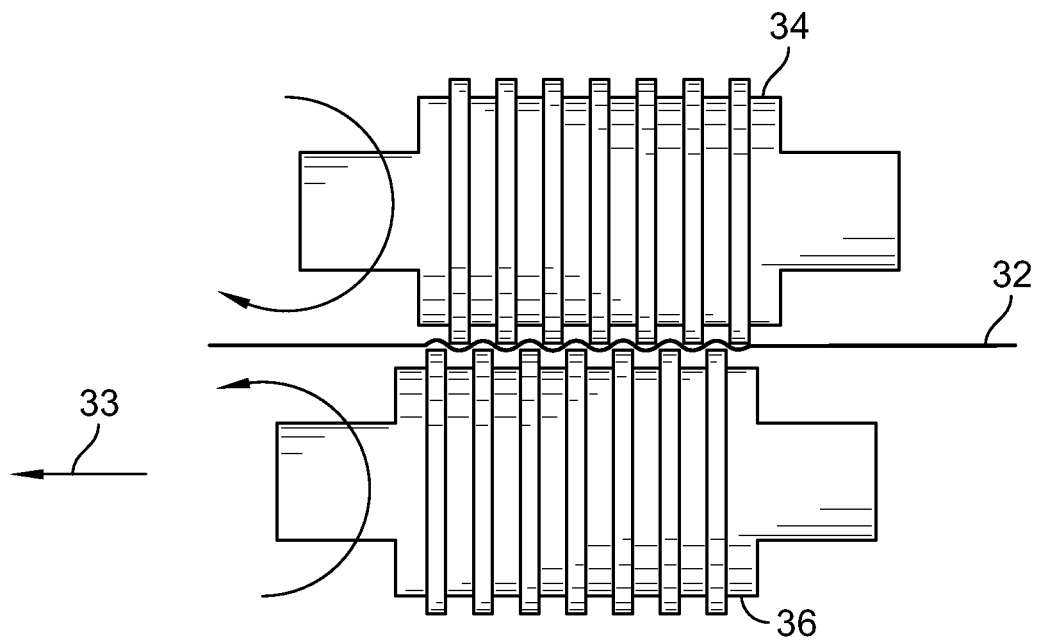
FIG. 4 is a diagrammatic view of an exemplary process for intermeshing gears (IMG) stretching of a polymeric film.

In a further example, stretching may be achieved via intermeshing gears (IMG) stretching by a process analogous to the one shown in simplified schematic form in FIG. 4. For example, a film 32 may be moved between a pair of grooved or toothed rollers as shown in FIG. 4 in the direction of arrow 33. In one example, the first toothed roller 34 may be rotated in a clockwise direction while the second toothed roller 36 may be rotated in a counterclockwise direction. At each point at which one or more teeth of the rollers 34 and 36 contact the film 32, localized stresses may be applied that stretch the film 32 and introduce interconnecting micropores therein analogous to the micropores 8 shown in FIG. 1. By the use of IMG stretching, the film 32 may be stretched in the machine direction (MD), the cross direction (CD), at oblique angles to the MD, or in any combination thereof.

A precursor film containing a thermoplastic polymer 4 and a solid filler 6 dispersed in the polymer 4 that is stretched to form a gas-permeable barrier film 2 in accordance with the present disclosure may be prepared by mixing together the thermoplastic polymer 4 (or a combination of thermoplastic polymers 4), the solid filler 6, and any optional components until blended, heating the mixture, and then extruding the mixture to form a molten web. A suitable film-forming process may be used to form a precursor film en route to forming a gas-permeable barrier film. For example, the precursor film may be manufactured by casting or extrusion using blown-film, co-extrusion, or single-layer extrusion techniques and/or the like. In one example, the precursor film may be wound onto a winder roll for subsequent stretching in accordance with the present disclosure. In another example, the precursor film may be manufactured in-line with a film stretching apparatus such as shown in one or more of FIGS. 2-4.

In addition to containing one or more thermoplastic polymers and solid filler, the precursor film may also contain other optional components to improve the film properties or processing of the film. Representative optional components include, but are not limited to, anti-oxidants (e.g., added to prevent polymer degradation and/or to reduce the tendency of the film to discolor over time) and processing aids (e.g., added to facilitate extrusion of the precursor film). In one example, the amount of one or more anti-oxidants in the precursor film is less than about 1% by weight of the film and the amount of one or more processing aids is less than about 5% by weight of the film. Additional optional additives include but are not limited to whitening agents (e.g., titanium dioxide), which may be added to increase the opacity of the film. In one example, the amount of one or more whitening agents is less than about 10% by weight of the film. Further optional components include but are not limited to antiblocking agents (e.g., diatomaceous earth) and slip agents (e.g. erucamide a.k.a. erucylamide), which may be added to allow film rolls to unwind properly and to facilitate secondary processing. In one example, the amount of one or more antiblocking agents and/or one or more slip agents is less than about 5% by weight of the film. Further additional optional additives include but are not limited to scents, deodorizers, pigments other than white, noise reducing agents, and/or the like, and combinations thereof. In one example, the amount of one or more scents, deodorizers, pigments other than white, and/or noise reducing agents is less than about 10% by weight of the film.

Figure 9:
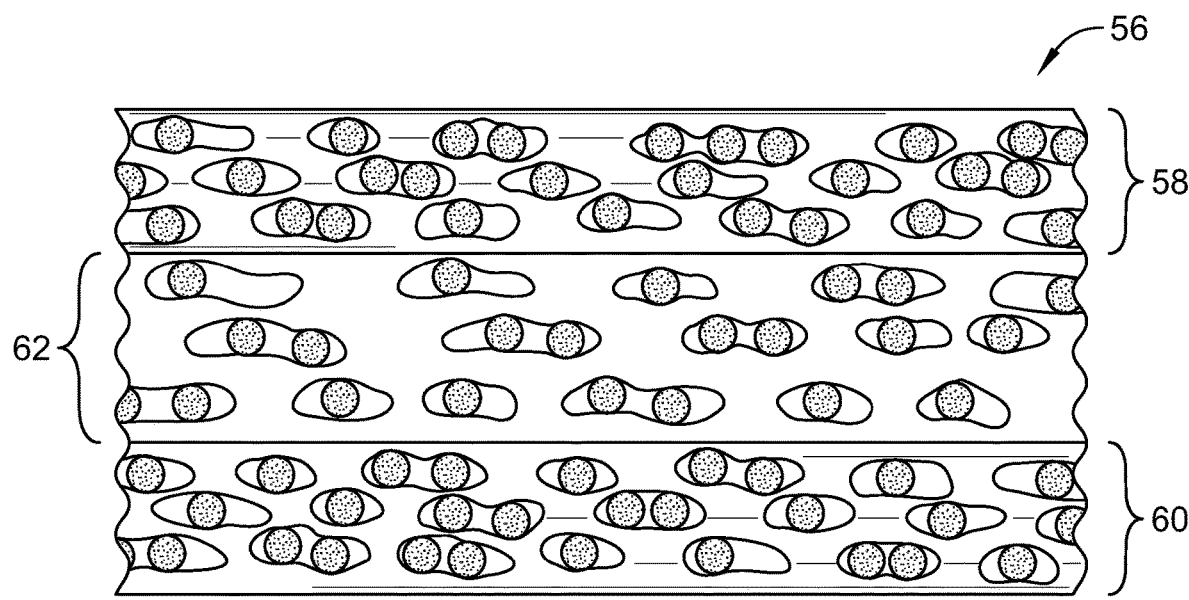
FIG. 9 is a diagrammatic view of a representative embodiment of a multi-layer gas-permeable barrier film that includes three layers.

Prior to stretching, the precursor film may have an initial basis weight of less than about 400 grams per square meter (gsm). In one example, the precursor film has an initial basis weight of less than about 350 gsm. The precursor film may be a monolayer film, in which case the entire precursor film comprises the thermoplastic polymer (or combination of thermoplastic polymers) and solid filler (or combination of solid fillers). In another example, the precursor film may be a multilayer film as shown in FIG. 9.

In one example, a gas-permeable barrier film 2 in accordance with the present disclosure is formed via a blown film process. In another example, a gas-permeable barrier film 2 in accordance with the present disclosure is formed via a cast film process. The cast film process involves the extrusion of molten polymers through an extrusion die to form a thin film. The film is pinned to the surface of a chill roll with an air knife, an air blanket, and/or a vacuum box. Alternatively, the film is subjected to an embossing process on a patterned chill roll.

In illustrative embodiments, a process for making a gas-permeable barrier film 2 in accordance with the present disclosure includes (a) extruding a composition containing a thermoplastic polymer 4 and a solid filler 6 to form a molten web, (b) casting the molten web against a surface of a chill roll to form a quenched film, and (c) stretching the quenched film to form the gas-permeable barrier film 2.

It has been discovered that by extruding a composition containing a thermoplastic polymer and an inorganic filler, and then subjecting the quenched film to a stretching process as described herein, gas-permeable barrier films 2 exhibiting surprisingly and unexpectedly improved properties as compared to other gas-permeable barrier films may be prepared. As further described below, these properties may include high gas transmission rate (e.g., high porosity) in combination with moisture and microbial barrier protection. The combination of high gas transmission rate and barrier protection is desirable for applications ranging from medical/pharmaceutical packaging to house wraps, and was heretofore achieved using flashspun high-density polyethylene of the type sold under the trade name TYVEK by Dupont. Since TYVEK is formed from a loose fibril structure that is subsequently compacted to achieve a desired degree of microbial barrier, gas-permeable barrier films 2 in accordance with the present disclosure, which are not based on the intermediacy of a loose fibril structure, may provide greater control over the uniformity of the porosity of a film.

In accordance with the present disclosure, the casting of the molten web against a surface of a chill roll to form a quenched film may be achieved in various ways. In illustrative embodiments, a vacuum box, blowing air (e.g., an air knife and/or an air blanket), or a vacuum box in combination with blowing air to form a quenched film may be used to cast the molten web against the chill roll. In thin film applications, the use of a vacuum box and/or blowing air may avoid the phenomenon of draw resonance that may arise in embossing processes. However, for applications requiring thicker films (e.g., basis weights greater than about 75 gsm in the case of a polypropylene film), draw resonance may not be a problem, and the quenched film may instead be formed by an embossing process. While neither desiring to be bound by any particular theory nor intending to limit in any measure the scope of the appended claims or their equivalents, it is presently believed that an embossing process may further serve to increase porosity of a quenched film in accordance with the present disclosure.

A high degree of orientation (e.g., such as found in an MDO or biaxially-oriented film) oftentimes results in a splitty film. Thus, it was surprising and unexpected to observe that a high degree of orientation was not required in order to achieve high porosity in a microporous film in accordance with the present disclosure. Rather, a gas-permeable barrier film with good properties was obtained by subjecting a quenched film to a stretching process in accordance with the present disclosure. In illustrative embodiments, the stretching process includes CD IMG stretching followed by post-stretching (e.g., in a machine direction). While neither desiring to be bound by any particular theory nor intending to limit in any measure the scope of the appended claims or their equivalents, it is presently believed that the process of CD IMG stretching and subsequent post-stretching results in lanes of unstretched material, which correspond to portions of the film that travelled atop teeth in the CD IMG rollers. These lanes of unstretched material provide toughness to the film that may prevent tear propagation.

Representative techniques for casting a molten web against a surface of a chill roll to form a quenched film in accordance with the present disclosure are described below.

Figure 5:
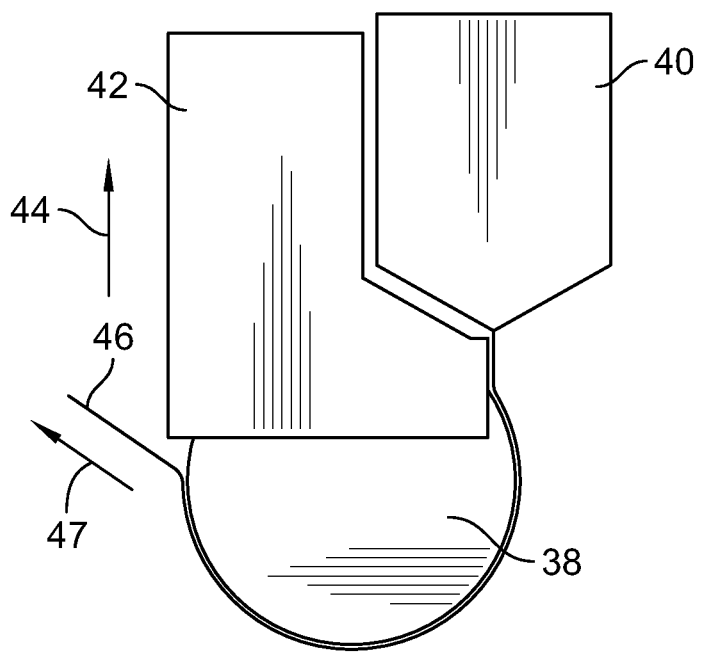
FIG. 5 is a diagrammatic view of an exemplary process for casting a molten web against a chill roll using a vacuum box.

In one example, the molten web is cast against the surface of the chill roll under negative pressure using a vacuum box as shown in simplified schematic form in FIG. 5. A vacuum box works by evacuating air between the film and the surface of the chill roll. For example, as shown in FIG. 5, a film 46 is extruded from an extrusion die 40 in the direction of arrow 47 and quenched from the molten state with a vacuum box 42. The vacuum box 42 draws a vacuum behind the molten web 46 in the direction of arrow 44 to draw the film 46 down onto the chill roll 38. The vacuum drawn in the direction of arrow 44 removes the entrained air between the surface of the chill roll 38 and the film 46. The vacuum box process is not subject to draw resonance for high molecular weight polymers that would tend to extrude unstable thickness in a nipped quench process due to the draw resonance phenomenon.

When a vacuum box 42 is used, the molten polymer may exit the die 40 and hit the chill roll 38 within a smaller distance than in an embossed process. For example, in some embodiments, the melt curtain is configured to hit the chill roll 38 within a distance of less than about 12 inches, 11 inches, 10 inches, 9 inches, 8 inches, 7 inches, 6 inches, 5 inches, 4 inches, 3, inches, 2 inches, or 1 inch. In illustrative embodiments, the melt curtain is configured to exit the die and hit the roll within a distance of less than about 3 inches and, in some examples, within a distance of about or less than 1 inch. One advantage of reducing the distance between the die 40 and the roll surface 38 as compared to in a nipped quench process is that smaller distances are less susceptible to the phenomenon of neck-in. Neck-in refers to a reduction in width of the molten web that occurs as the web leaves the die. By drawing the film 46 onto a surface of the chill roll 38 over a short distance as shown in FIG. 5, the vacuum box 42 may enhance web cooling, facilitate higher line speeds, reduce film neck-in, and/or reduce drag at the lip exit.

Figure 6:
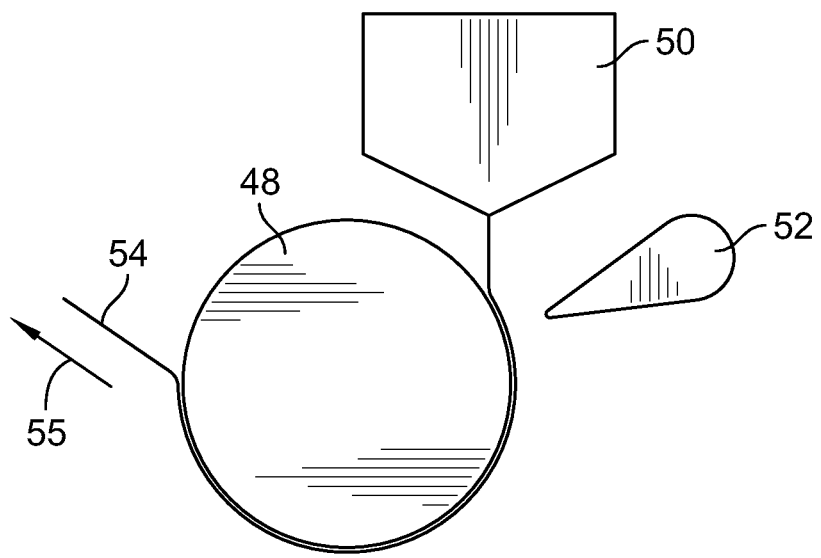
FIG. 6 is a diagrammatic view of an exemplary process for casting a molten web against a chill roll using an air knife.

In another example, the molten web is cast against the surface of the chill roll under positive pressure using an air knife or air blanket, as shown in simplified schematic form in FIG. 6. An air knife works to promote web quenching by gently blowing a high-velocity, low-volume air curtain over the molten film, thereby pinning the molten film to the chill roll for solidification. For example, as shown in FIG. 6, a film 54 is extruded from an extrusion die 50 in the direction of arrow 55 and quenched from the molten state with an air knife 52 blowing an air curtain over the molten film 54, thereby pinning the molten web 54 against a surface of the chill roll 48. An air blanket (a.k.a. a soft box) works similarly to an air knife and promotes web quenching by gently blowing an air curtain over the molten film. However, in the case of an air blanket, the air curtain is low velocity and high volume.

In a further example, the molten web is cast against the surface of the chill roll under a combination of negative pressure from a vacuum box, as shown in FIG. 5, and positive pressure from an air knife, as shown in FIG. 6. In illustrative embodiments, when casting the molten web against a surface of the chill roll, an exit temperature of cooling fluid passing through the chill roll is between about 50 degrees Fahrenheit and about 130 degrees Fahrenheit and, in some examples, between about 75 degrees Fahrenheit and about 130 degrees Fahrenheit.

Figure 7:
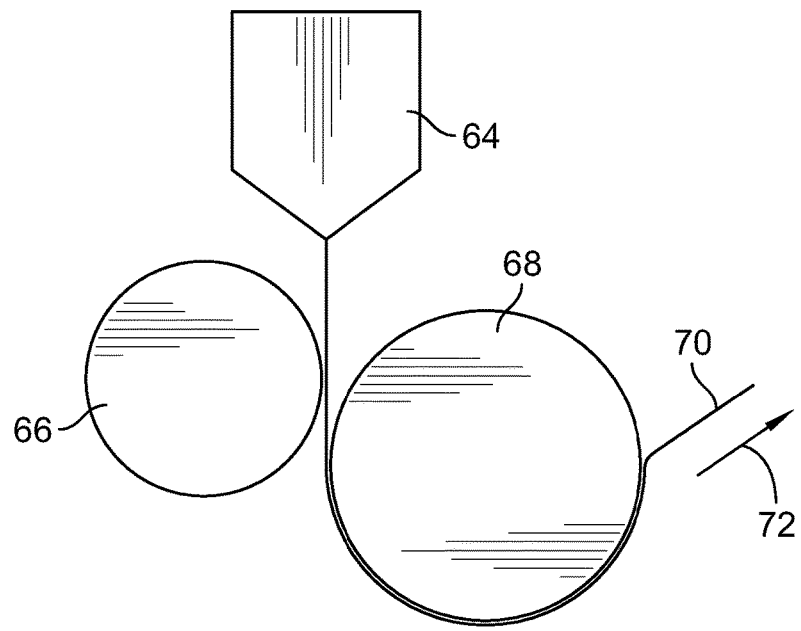
FIG. 7 is a diagrammatic view of an exemplary process for casting a molten web against a chilled embossing roll.

In a further example, the molten web is cast against the surface of the chill roll via an embossing process, as shown in simplified schematic form in FIG. 7. In an embossing process, a pattern engraved on a chill roll may be transferred to a film. For example, as shown in FIG. 7, a molten web is extruded from an extrusion die 64 and passed between an engraved chill cast roll 68 (e.g., a steel roll) and a second roll 66 (e.g., a rubber roll). The rubber roll 66 applies a force against the molten web such that the resultant quenched film 70 accepts a pattern from the engraved chill cast roll 68.

Figure 8:
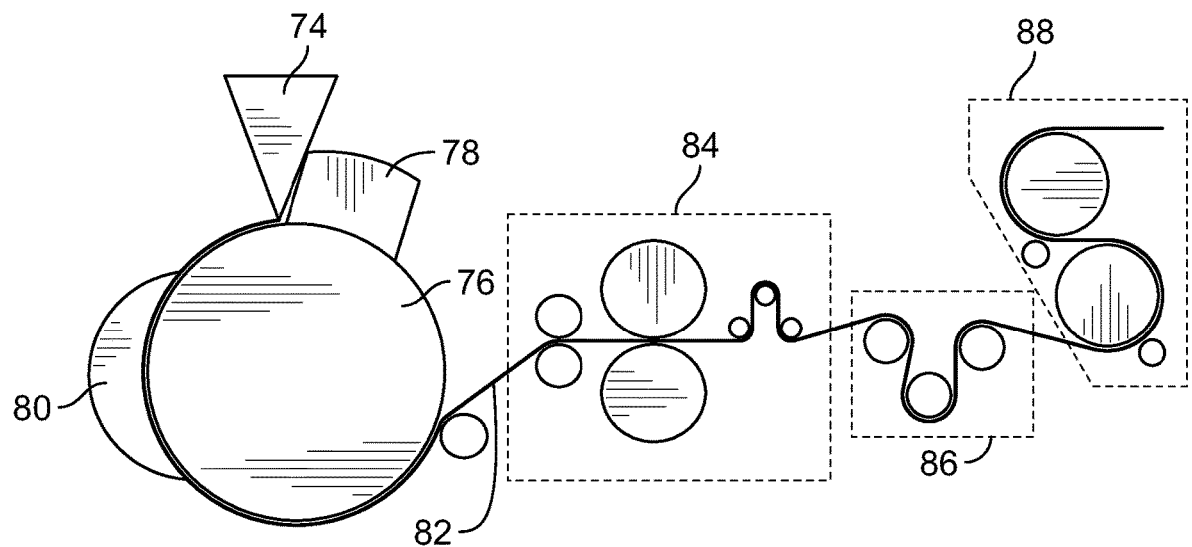
FIG. 8 is a diagrammatic view of an exemplary process for casting a molten web against a chill roll using a vacuum box and an air knife, stretching the quenched film by CD IMG, post-stretching the CD IMG-stretched film in a machine direction, and annealing the stretched film.

In illustrative embodiments, a process for making a gas-permeable barrier film 2 in accordance with the present disclosure may be executed as shown in simplified schematic form in FIG. 8. The process includes extruding a composition containing a thermoplastic polymer 4 and a solid filler 6 from a die 74 to form a molten web. The molten web is cast against a surface of a chill roll 76 under a combination of negative pressure from a vacuum box 78 and positive pressure from an air blanket 80 to form a quenched film 82. The quenched film 82 is stretched by CD IMG stretching at a CD IMG stretching station 84. The CD IMG-stretched film exiting CD IMG stretching station 84 receives subsequent post-stretching from a series of rollers moving at different speeds (e.g., machine direction stretching) at a post-stretching station 86. Once the film has undergone CD IMG stretching and subsequent post-stretching, the film is annealed at an annealing station 88, thus providing a gas-permeable barrier film 2 in accordance with the present disclosure.

The thermoplastic polymer 4 (or combination of thermoplastic polymers 4) used to make a gas-permeable barrier film 2 in accordance with the present disclosure is not restricted, and may include all manner of thermoplastic polymers capable of being stretched and of forming micropores. In illustrative embodiments, the thermoplastic polymer is a polyolefin, including but not limited to homopolymers, copolymers, terpolymers, and/or blends thereof.

Representative polyolefins that may be used in accordance with the present disclosure include but are not limited to polyethylene, polypropylene, and a combination thereof. By way of example, representative polyolefins include but are not limited to low density polyethylene (LDPE), high density polyethylene (HDPE), linear low density polyethylene (LLDPE), ultra-low density polyethylene (ULDPE), polypropylene, ethylene-propylene copolymers, polymers made using a single-site catalyst, ethylene maleic anhydride copolymers (EMAs), ethylene vinyl acetate copolymers (EVAs), polymers made using Ziegler-Natta catalysts, styrene-containing block copolymers, and/or the like, and combinations thereof. Methods for manufacturing LDPE are described in *The Wiley Encyclopedia of Packaging Technology*, pp. 753-754 (Aaron L. Brody et al. eds., 2nd Ed. 1997) and in U.S. Pat. No. 5,399,426, both of which are incorporated by reference herein, except that in the event of any inconsistent disclosure or definition from the present specification, the disclosure or definition herein shall be deemed to prevail.

ULDPE may be produced by a variety of processes, including but not limited to gas phase, solution and slurry polymerization as described in *The Wiley Encyclopedia of Packaging Technology*, pp. 748-50 (Aaron L. Brody et al. eds., 2nd Ed. 1997), incorporated by reference above, except that in the event of any inconsistent disclosure or definition from the present specification, the disclosure or definition herein shall be deemed to prevail.

ULDPE may be manufactured using a Ziegler-Natta catalyst, although a number of other catalysts may also be used. For example, ULDPE may be manufactured with a metallocene catalyst. Alternatively, ULDPE may be manufactured with a catalyst that is a hybrid of a metallocene catalyst and a Ziegler-Natta catalyst. Methods for manufacturing ULDPE are also described in U.S. Pat. Nos. 5,399,426, 4,668,752, 3,058,963, 2,905,645, 2,862,917, and 2,699,457, each of which is incorporated by reference herein in its entirety, except that in the event of any inconsistent disclosure or definition from the present specification, the disclosure or definition herein shall be deemed to prevail. The density of ULDPE is achieved by copolymerizing ethylene with a sufficient amount of one or more monomers. In illustrative embodiments, the monomers are selected from 1-butene, 1-hexene, 4-methyl-1-pentene, 1-octene, and combinations thereof. Methods for manufacturing polypropylene are described in *Kirk-Othmer Concise Encyclopedia of Chemical Technology*, pp. 1420-1421 (Jacqueline I. Kroschwitz et al. eds., 4th Ed. 1999), which is incorporated herein by reference, except that in the event of any inconsistent disclosure or definition from the present specification, the disclosure or definition herein shall be deemed to prevail.

In illustrative embodiments, a polyolefin for use in accordance with the present disclosure includes polyethylene, polypropylene, or a combination thereof. In one example, the polyethylene includes linear low density polyethylene which, in some examples, includes a metallocene polyethylene. In another example, the polyethylene includes a combination of linear low density polyethylene and low density polyethylene. In a further example, the polyolefin consists essentially of only linear low density polyethylene. In another example, the polypropylene includes polypropylene impact copolymer. In a further example, the polyolefin consists essentially of polypropylene impact copolymer.

In addition to thermoplastic polymer (e.g., polyolefin), a composition to be extruded in accordance with the present disclosure further includes a solid filler. The solid filler is not restricted, and may include all manner of inorganic or organic materials that are (a) non-reactive with thermoplastic polymer, (b) configured for being uniformly blended and dispersed in the thermoplastic polymer, and (c) configured to promote a gas-permeable structure within the film when the film is stretched. In illustrative embodiments, the solid filler includes an inorganic filler.

Representative inorganic fillers for use in accordance with the present disclosure include but are not limited to sodium carbonate, calcium carbonate, magnesium carbonate, barium sulfate, magnesium sulfate, aluminum sulfate, magnesium oxide, calcium oxide, alumina, mica, talc, silica, clay (e.g., non-swellable clay), glass spheres, titanium dioxide, aluminum hydroxide, zeolites, and a combination thereof. In illustrative embodiments, the inorganic filler includes an alkali metal carbonate, an alkaline earth metal carbonate, an alkali metal sulfate, an alkaline earth metal sulfate, or a combination thereof. In one example, the inorganic filler includes calcium carbonate.

In another example, the solid filler includes a polymer (e.g., high molecular weight high density polyethylene, polystyrene, nylon, blends thereof, and/or the like). The use of polymer fillers creates domains within the thermoplastic polymer matrix. These domains are small areas, which may be spherical, where only the polymer filler is present as compared to the remainder of the thermoplastic matrix where no polymer filler is present. As such, these domains act as particles.

The solid filler 6 provided in a composition to be extruded in accordance with the present disclosure may be used to produce micropores 8 of film 2, as shown in FIG. 1. The dimensions of the solid filler 6 particles may be varied based on a desired end use (e.g., the desired properties of the gas-permeable barrier film 2). In one example, the average particle size of a solid filler particle ranges from about 0.1 microns to about 15 microns. In another example, the average particle size of a solid filler particle ranges from about 0.1 microns to about 10 microns or from about 0.1 microns to about 9.5 microns. In illustrative embodiments, the average particle size ranges from about 1 micron to about 9 microns, in some examples from about 1 micron to about 5 microns and, in other examples, from about 1 micron to about 3 microns. The average particle size may be one of several different values or fall within one of several different ranges. For example, it is within the scope of the present disclosure to select an average particle size of the solid filler to be one of the following values: about 0.1 microns, 0.2 microns, 0.3 microns, 0.4 microns, 0.5 microns, 0.6 microns, 0.7 microns, 0.8 microns, 0.9 microns, 1.0 microns, 1.1 microns, 1.2 microns, 1.3 microns, 1.4 microns, 1.5 microns, 1.6 microns, 1.7 microns, 1.8 microns, 1.9 microns, 2.0 microns, 2.1 microns, 2.2 microns, 2.3 microns, 2.4 microns, 2.5 microns, 2.6 microns, 2.7 microns, 2.8 microns, 2.9 microns, 3.0 microns, 3.5 microns, 4.0 microns, 4.5 microns, 5.0 microns, 5.5 microns, 6.0 microns, 6.5 microns, 7.0 microns, 7.5 microns, 8.0 microns, 8.5 microns, 9.0 microns, 9.5 microns, 10.0 microns, 10.5 microns, 11.0 microns, 11.5 microns, 12.0 microns, 12.5 microns, 13.0 microns, 13.5 microns, 14.0 microns, 14.5 microns, or 15.0 microns.

It is also within the scope of the present disclosure for the average particle size of the solid filler 6 provided in a composition to be extruded in accordance with the present disclosure to fall within one of many different ranges. In a first set of ranges, the average particle size of the solid filler 6 is in one of the following ranges: about 0.1 microns to 15 microns, 0.1 microns to 14 microns, 0.1 microns to 13 microns, 0.1 microns to 12 microns, 0.1 microns to 11 microns, 0.1 microns to 10 microns, 0.1 microns to 9.9 microns, 0.1 microns to 9.8 microns, 0.1 microns to 9.7 microns, 0.1 microns to 9.6 microns, 0.1 microns to 9.5 microns, 0.1 microns to 9.4 microns, 0.1 microns to 9.3 microns, 0.1 microns to 9.2 microns, 0.1 microns to 9.1 microns, 0.1 microns to 9 microns, 0.1 microns to 8 microns, 0.1 microns to 7 microns, 0.1 microns to 6 microns, 0.1 microns to 5 microns, 0.1 microns to 4 microns, and 0.1 microns to 3 microns. In a second set of ranges, the average particle size of the solid filler 6 is in one of the following ranges: about 0.1 microns to 5 microns, 0.2 microns to 5 microns, 0.3 microns to 5 microns, 0.4 microns to 5 microns, 0.5 microns to 5 microns, 0.6 microns to 5 microns, 0.7 microns to 5 microns, 0.8 microns to 5 microns, 0.9 microns to 5 microns, and 1.0 microns to 5 microns. In a third set of ranges, the average particle size of the solid filler 6 is in one of the following ranges: about 0.1 microns to 4.9 microns, 0.2 microns to 4.8 microns, 0.3 microns to 4.7 microns, 0.4 microns to 4.6 microns, 0.5 microns to 4.5 microns, 0.6 microns to 4.4 microns, 0.7 microns to 4.3 microns, 0.8 microns to 4.2 microns, 0.9 microns to 4.1 microns, and 1.0 microns to 4.0 microns.

In illustrative embodiments, the amount of solid filler used in accordance with the present disclosure includes from about 30% by weight to about 75% by weight of the composition to be extruded, quenched film formed from the extruded composition, and/or gas-permeable barrier film formed from the quenched film. In further illustrative embodiments, the amount of solid filler used in accordance with the present disclosure includes from about 50% by weight to about 75% by weight of the composition to be extruded, quenched film formed from the extruded composition, and/or gas-permeable barrier film formed from the quenched film. Although amounts of filler outside this range may also be employed, an amount of solid filler that is less than about 30% by weight may not be sufficient to impart uniform breathability to a film. Conversely, amounts of filler greater than about 75% by weight may be difficult to blend with the polymer and may cause a loss in strength in the final gas-permeable barrier film.

The amount of solid filler 6 may be varied based on a desired end use (e.g., the desired properties of the gas-permeable barrier film 2). In one example, the amount of solid filler 6 ranges from about 40% to about 60% by weight of the composition, quenched film, and/or gas-permeable barrier film. In another example, the amount of solid filler 6 ranges from about 45% to about 55% by weight of the composition, quenched film, and/or gas-permeable barrier film. The amount of solid filler 6 may be one of several different values or fall within one of several different ranges. For example, it is within the scope of the present disclosure to select an amount of the solid filler 6 to be one of the following values: about 30%, 31%, 32%, 33%, 34%, 35%, 36%, 37%, 38%, 39%, 40%, 41%, 42%, 43%, 44%, 45%, 46%, 47%, 48%, 49%, 50%, 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, or 75% by weight of the composition, quenched film, and/or gas-permeable barrier film.

It is also within the scope of the present disclosure for the amount of the solid filler 6 to fall within one of many different ranges. In a first set of ranges, the amount of the solid filler 6 is in one of the following ranges: about 31% to 75%, 32% to 75%, 33% to 75%, 34% to 75%, 35% to 75%, 36% to 75%, 37% to 75%, 38% to 75%, 39% to 75%, 40% to 75%, 41% to 75%, 42% to 75%, 43% to 75%, 44% to 75%, and 45% to 75% by weight of the composition, quenched film, and/or gas-permeable barrier film. In a second set of ranges, the amount of the solid filler is in one of the following ranges: about 30% to 74%, 30% to 73%, 30% to 72%, 30% to 71%, 30% to 70%, 30% to 69%, 30% to 68%, 30% to 67%, 30% to 66%, 30% to 65%, 30% to 64%, 30% to 63%, 30% to 62%, 30% to 61%, 30% to 60%, 30% to 59%, 30% to 58%, 30% to 57%, 30% to 56%, 30% to 55%, 30% to 54%, 30% to 53%, 30% to 52%, 30% to 51%, 30% to 50%, 30% to 49%, 30% to 48%, 30% to 47%, 30% to 46%, and 30% to 45% by weight of the composition, quenched film, and/or gas-permeable barrier film. In a third set of ranges, the amount of the solid filler is in one of the following ranges: about 31% to 74%, 32% to 73%, 33% to 72%, 34% to 71%, 35% to 70%, 36% to 69%, 37% to 68%, 38% to 67%, 39% to 66%, 40% to 65%, 41% to 64%, 42% to 63%, 43% to 62%, 44% to 61%, 45% to 60%, 45% to 59%, 45% to 58%, 45% to 57%, 45% to 56%, and 45% to 55% by weight of the composition, quenched film, and/or gas-permeable barrier film.

Although filler loading may be conveniently expressed in terms of weight percentages, the phenomenon of microporosity may alternatively be described in terms of volume percent of filler relative to total volume. By way of illustration, for calcium carbonate filler having a specific gravity of 2.7 g/cc and a polymer having a specific gravity of about 0.9, 35% by weight $CaCO_3$ corresponds to a filler loading of about 15% by volume $\{(0.35/2.7)/(0.65/0.9+0.35/2.7)\}$. Similarly, the 75 weight percent upper end of the range described above corresponds to about 56% by volume of $CaCO_3$. Thus, the amount of filler may be adjusted to provide comparable volume percentages for alternative solid fillers that have different (e.g., unusually low or high) specific gravities as compared to calcium carbonate.

In some embodiments, to render the solid filler particles free-flowing and to facilitate their dispersion in the polymeric material, the filler particles may be coated with a fatty acid and/or other suitable processing acid. Representative fatty acids for use in this context include but are not limited to stearic acid or longer chain fatty acids.

The type of stretching used to transform a quenched film into a gas-permeable barrier film 2 in accordance with the present disclosure is not restricted. All manner of stretching processes—and combinations of stretching processes—that are capable of moving (e.g., pulling) polymeric material 4 away from the surface of solid filler 6 dispersed therein in order to form micropores 8—are contemplated for use. In some examples, the stretching includes MD stretching. In other examples, the stretching includes CD IMG stretching. In further examples, the stretching includes MD IMG stretching. In still further examples, the stretching includes cold draw. In some embodiments, the stretching includes a combination of two or more different types of stretching including but not limited to MD stretching, CD IMG stretching, MD IMG stretching, cold draw, and/or the like. In some examples, the stretching includes a combination of CD IMG stretching and cold draw (which, in some embodiments, is performed subsequently to the CD IMG stretching).

In illustrative embodiments, the type of stretching used to transform a quenched film into a gas-permeable barrier film 2 in accordance with the present disclosure includes CD IMG stretching. In addition, in illustrative embodiments, at least a portion of the stretching is performed at a temperature above ambient temperature. In one example, at least a portion of the stretching is performed at a temperature of between about 60 degrees Fahrenheit and about 225 degrees Fahrenheit.

In illustrative embodiments, a process for making a gas-permeable barrier film 2 in accordance with the present disclosure further includes (d) annealing the gas-permeable barrier film 2. In one example, the annealing is performed at a temperature of between about 75 degrees Fahrenheit and about 225 degrees Fahrenheit.

The basis weight of a gas-permeable barrier film 2 in accordance with the present disclosure may be varied based on a desired end use (e.g., the desired properties and/or applications of the gas-permeable barrier film). In one example, the basis weight ranges from about 5 gsm to about 100 gsm. In another example, the basis weight ranges from about 10 gsm to about 90 gsm. In illustrative embodiments, the basis weight is less than about 100 gsm, in some examples less than about 90 gsm, and in other examples less than about 80 gsm. Although basis weights outside this range may also be employed (e.g., basis weights above about 100 gsm), lower basis weights minimize material cost and may be preferable for at least this reason.

The basis weight of a gas-permeable barrier film 2 in accordance with the present disclosure may be one of several different values or fall within one of several different ranges. For example, it is within the scope of the present disclosure to select a basis weight to be one of the following values: about 60 gsm, 61 gsm, 62 gsm, 63 gsm, 64 gsm, 65 gsm, 66 gsm, 67 gsm, 68 gsm, 69 gsm, 70 gsm, 71 gsm, 72 gsm, 73 gsm, 74 gsm, 75 gsm, 76 gsm, 77 gsm, 78 gsm, 79 gsm, 80 gsm, 81 gsm, 82 gsm, 83 gsm, 84 gsm, 85 gsm, 86 gsm, 87 gsm, 88 gsm, 89 gsm, 90 gsm, 91 gsm, 92 gsm, 93 gsm, 94 gsm, 95 gsm, 96 gsm, 97 gsm, 98 gsm, 99 gsm, or 100 gsm.

It is also within the scope of the present disclosure for the basis weight of the gas-permeable barrier film 2 to fall within one of many different ranges. In a first set of ranges, the basis weight of the gas-permeable barrier film 2 is in one of the following ranges: about 60 gsm to 100 gsm, 60 gsm to 99 gsm, 60 gsm to 98 gsm, 60 gsm to 97 gsm, 60 gsm to 96 gsm, 60 gsm to 95 gsm, 60 gsm to 94 gsm, 60 gsm to 93 gsm, 60 gsm to 92 gsm, 60 gsm to 91 gsm, 60 gsm to 90 gsm, 60 gsm to 89 gsm, 60 gsm to 88 gsm, 60 gsm to 87 gsm, 60 gsm to 86 gsm, 60 gsm to 85 gsm, 60 gsm to 84 gsm, 60 gsm to 83 gsm, 60 gsm to 82 gsm, 60 gsm to 81 gsm, 60 gsm to 80 gsm, 60 gsm to 79 gsm, 60 gsm to 78 gsm, 60 gsm to 77 gsm, 60 gsm to 76 gsm, 60 gsm to 75 gsm, 60 gsm to 74 gsm, 60 gsm to 73 gsm, 60 gsm to 72 gsm, 60 gsm to 71 gsm, and 60 gsm to 70 gsm. In a second set of ranges, the basis weight of the gas-permeable barrier film is in one of the following ranges: about 60 gsm to 90 gsm, 61 gsm to 90 gsm, 62 gsm to 90 gsm, 63 gsm to 90 gsm, 64 gsm to 90 gsm, 65 gsm to 90 gsm, 66 gsm to 90 gsm, 67 gsm to 90 gsm, 68 gsm to 90 gsm, 69 gsm to 90 gsm, 70 gsm to 90 gsm, 71 gsm to 90 gsm, 72 gsm to 90 gsm, 73 gsm to 90 gsm, 74 gsm to 90 gsm, 75 gsm to 90 gsm, 76 gsm to 90 gsm, 77 gsm to 90 gsm, 78 gsm to 90 gsm, 79 gsm to 90 gsm, and 80 gsm to 90 gsm. In a third set of ranges, the basis weight of the gas-permeable barrier film 2 is in one of the following ranges: about 61 gsm to 99 gsm, 62 gsm to 98 gsm, 63 gsm to 97 gsm, 64 gsm to 96 gsm, 65 gsm to 95 gsm, 66 gsm to 94 gsm, 67 gsm to 93 gsm, 68 gsm to 92 gsm, 69 gsm to 91 gsm, 70 gsm to 89 gsm, 70 gsm to 88 gsm, 70 gsm to 87 gsm, 70 gsm to 86 gsm, 70 gsm to 85 gsm, 70 gsm to 84 gsm, 70 gsm to 83 gsm, 70 gsm to 82 gsm, 70 gsm to 81 gsm, 70 gsm to 80 gsm, 71 gsm to 79 gsm, 72 gsm to 78 gsm, 73 gsm to 77 gsm, and 74 gsm to 76 gsm.

In illustrative embodiments, as noted above, a gas-permeable barrier film 2 prepared in accordance with the present disclosure (e.g., by casting a molten web containing a polyolefin and an inorganic filler against a chill roll and stretching the resultant quenched film) may exhibit high gas transmission rate as evidenced, for example, by a low Gurley porosity value. The Gurley porosity value is measured in units of time (i.e., seconds) and describes the number of seconds required for 100 cubic centimeters of air to pass through 1.0 square inch of a given material at a pressure differential of 4.88 inches of water (0.176 psi).

The Gurley porosity of a gas-permeable barrier film 2 in accordance with the present disclosure may be one of several different values. For example, for a gas-permeable barrier film 2 having a basis weight of less than about 100 gsm—in some embodiments, less than about 90 gsm, less than about 80 gsm, or between about 70 gsm and 80 gsm—it is within the scope of the present disclosure to select a Gurley porosity to be less than or equal to one of the following values: about 330 seconds, 329 seconds, 328 seconds, 327 seconds, 326 seconds, 325 seconds, 324 seconds, 323 seconds, 322 seconds, 321 seconds, 320 seconds, 319 seconds, 318 seconds, 317 seconds, 316 seconds, 315 seconds, 314 seconds, 313 seconds, 312 seconds, 311 seconds, 310 seconds, 309 seconds, 308 seconds, 307 seconds, 306 seconds, 305 seconds, 304 seconds, 303 seconds, 302 seconds, 301 seconds, 300 seconds, 299 seconds, 298 seconds, 297 seconds, 296 seconds, 295 seconds, 294 seconds, 293 seconds, 292 seconds, 291 seconds, 290 seconds, 289 seconds, 288 seconds, 287 seconds, 286 seconds, 285 seconds, 284 seconds, 283 seconds, 282 seconds, 281 seconds, 280 seconds, 279 seconds, 278 seconds, 277 seconds, 276 seconds, 275 seconds, 274 seconds, 273 seconds, 272 seconds, 271 seconds, 270 seconds, 269 seconds, 268 seconds, 267 seconds, 266 seconds, 265 seconds, 264 seconds, 263 seconds, 262 seconds, 261 seconds, 260 seconds, 259 seconds, 258 seconds, 257 seconds, 256 seconds, 255 seconds, 254 seconds, 253 seconds, 252 seconds, 251 seconds, 250 seconds, 249 seconds, 248 seconds, 247 seconds, 246 seconds, 245 seconds, 244 seconds, 243 seconds, 242 seconds, 241 seconds, 240 seconds, 239 seconds, 238 seconds, 237 seconds, 236 seconds, 235 seconds, 234 seconds, 233 seconds, 232 seconds, 231 seconds, 230 seconds, 229 seconds, 228 seconds, 227 seconds, 226 seconds, 225 seconds, 224 seconds, 223 seconds, 222 seconds, 221 seconds, 220 seconds, 219 seconds, 218 seconds, 217 seconds, 216 seconds, 215 seconds, 214 seconds, 213 seconds, 212 seconds, 211 seconds, 210 seconds, 209 seconds, 208 seconds, 207 seconds, 206 seconds, 205 seconds, 204 seconds, 203 seconds, 202 seconds, 201 seconds, 200 seconds, 199 seconds, 198 seconds, 197 seconds, 196 seconds, 195 seconds, 194 seconds, 193 seconds, 192 seconds, 191 seconds, 190 seconds, 189 seconds, 188 seconds, 187 seconds, 186 seconds, 185 seconds, 184 seconds, 183 seconds, 182 seconds, 181 seconds, 180 seconds, 179 seconds, 178 seconds, 177 seconds, 176 seconds, 175 seconds, 174 seconds, 173 seconds, 172 seconds, 171 seconds, 170 seconds, 169 seconds, 168 seconds, 167 seconds, 166 seconds, 165 seconds, 164 seconds, 163 seconds, 162 seconds, 161 seconds, 160 seconds, 159 seconds, 158 seconds, 157 seconds, 156 seconds, 155 seconds, 154 seconds, 153 seconds, 152 seconds, 151 seconds, 150 seconds, 149 seconds, 148 seconds, 147 seconds, 146 seconds, 145 seconds, 144 seconds, 143 seconds, 142 seconds, 141 seconds, 140 seconds, 139 seconds, 138 seconds, 137 seconds, 136 seconds, 135 seconds, 134 seconds, 133 seconds, 132 seconds, 131 seconds, 130 seconds, 129 seconds, 128 seconds, 127 seconds, 126 seconds, 125 seconds, 124 seconds, 123 seconds, 122 seconds, 121 seconds, 120 seconds, 119 seconds, 118 seconds, 117 seconds, 116 seconds, 115 seconds, 114 seconds, 113 seconds, 112 seconds, 111 seconds, 110 seconds, 109 seconds, 108 seconds, 107 seconds, 106 seconds, 105 seconds, 104 seconds, 103 seconds, 102 seconds, 101 seconds, 100 seconds, 99 seconds, 98 seconds, 97 seconds, 96 seconds, 95 seconds, 94 seconds, 93 seconds, 92 seconds, 91 seconds, 90 seconds, 89 seconds, 88 seconds, 87 seconds, 86 seconds, 85 seconds, 84 seconds, 83 seconds, 82 seconds, 81 seconds, 80 seconds, 79 seconds, 78 seconds, 77 seconds, 76 seconds, 75 seconds, 74 seconds, 73 seconds, 72 seconds, 71 seconds, 70 seconds, 69 seconds, 68 seconds, 67 seconds, 66 seconds, 65 seconds, 64 seconds, 63 seconds, 62 seconds, 61 seconds, 60 seconds, 59 seconds, 58 seconds, 57 seconds, 56 seconds, 55 seconds, 54 seconds, 53 seconds, 52 seconds, 51 seconds, 50 seconds, 49 seconds, 48 seconds, 47 seconds, 46 seconds, 45 seconds, 44 seconds, 43 seconds, 42 seconds, 41 seconds, 40 seconds, 39 seconds, 38 seconds, 37 seconds, 36 seconds, 35 seconds, 34 seconds, 33 seconds, 32 seconds, 31 seconds, or 30 seconds.

In some embodiments, as described above, the present disclosure provides a monolayer gas-permeable barrier film 2. In other embodiments, the present disclosure also provides a multi-layer gas-permeable barrier film 56, as shown in FIG. 9 described below. In one example, a multilayer gas-permeable barrier film includes a core layer and one or more outer skin layers adjacent to the core layer. The core layer may resemble the film 2 shown in FIG. 1 and include a thermoplastic polymer (or combination of thermoplastic polymers) and a solid filler (or combination of solid fillers) dispersed therein, whereas the one or more outer skin layers may have either the same composition as the core or a different composition than the core. In one example, the skin layers may be independently selected from compositions designed to minimize the levels of volatiles building up on the extrusion die. Upon subsequent stretching, the core layer becomes gas-permeable and breathable, while the skin layers may or may not be breathable depending upon whether or not they contain a solid filler. The thickness and composition of one or more skin layers in a multilayer version of a gas-permeable barrier film are selected so that, when the precursor film is subsequently stretched, the resulting film is still breathable. In one example, a pair of skin layers sandwiching a core layer are relatively thin and together account for no more than about 30% of the total film thickness. In some embodiments, regardless of whether or not a skin layer contains a solid filler, the skin layer may still be breathable. For example, the skin layer may include one or more discontinuities that are introduced during the stretching process. The likelihood of discontinuities forming in a skin layer may increase as the thickness of the skin layer subjected to stretching decreases.

In one example, a multi-layer gas-permeable barrier films in accordance with the present disclosure may be manufactured by feed block coextrusion. In another example, a multi-layer gas-permeable barrier films in accordance with the present disclosure may be made by blown film (tubular) coextrusion. Methods for feed block and blown film extrusion are described in *The Wiley Encyclopedia of Packaging Technology*, pp. 233-238 (Aaron L. Brody et al. eds., 2nd Ed. 1997), which is incorporated herein by reference, except that in the event of any inconsistent disclosure or definition from the present specification, the disclosure or definition herein shall be deemed to prevail. Methods for film extrusion are also described in U.S. Pat. No. 6,265,055, the entire contents of which are likewise incorporated by reference herein, except that in the event of any inconsistent disclosure or definition from the present specification, the disclosure or definition herein shall be deemed to prevail.

In some embodiments, as described above, the present disclosure provides mono-layer gas-permeable barrier films. In other embodiments, the present disclosure further provides multi-layer gas-permeable barrier films.

A multi-layer gas-permeable barrier film 56 is shown, for example, in FIG. 9. The multi-layer gas-permeable barrier film 56 shown in FIG. 9 includes a first gas-permeable barrier film layer 58, a second gas-permeable barrier film layer 60, and a third gas-permeable barrier film layer 62.

Each of the first gas-permeable barrier film layer 58, the second gas-permeable barrier film layer 60, and the third gas-permeable barrier film layer 62 shown in FIG. 8 is analogous to the gas-permeable barrier film 2 shown in FIG. 1, and may be prepared by a process analogous to that described above. In one example, each of the first gas-permeable barrier film layer 58, the second gas-permeable barrier film layer 60, and the third gas-permeable barrier film layer 62 includes a polyolefin and an inorganic filler dispersed in the polyolefin. In illustrative embodiments, each of the first gas-permeable barrier film layer 58, the second gas-permeable barrier film layer 60, and the third gas-permeable barrier film layer 62 has a basis weight of less than about 75 gsm and a Gurley porosity of less than about 300 seconds.

A multi-layer gas-permeable barrier film 56 in accordance with the present disclosure may contain one or a plurality of different types of gas-permeable barrier layers each of which may be placed in any order in the inner layers of the film structure. When a plurality of gas-permeable barrier layers is used, the individual gas-permeable barrier layers may differ from each other in thickness and/or type of thermoplastic polymer.

Multi-layer gas-permeable barrier films 56 of a type described above are not limited to any specific kind of film structure. Other film structures may achieve the same or similar result as the three-layer film 56 shown in FIG. 9. Film structure is a function of equipment design and capability. For example, the number of layers in a film depends only on the technology available and the desired end use for the film. Representative examples of film structures that may be implemented in accordance with the present disclosure include but are not limited to the following, wherein A represents a first gas-permeable barrier film layer and B represents a second gas-permeable barrier film layer:

A-A
A-B
A-B-A
A-A-B
A-A-B-A
A-B-A-A
A-A-B-A-A
A-B-A-A-A
A-B-A-B-A
A-B-A-A-A-A-A
A-A-B-A-A-A-A
A-A-A-B-A-A-A
A-B-A-A-A-B-A
A-B-A-A-B-A-A
A-B-A-B-A-A-A
A-B-A-B-A-B-A
A-B-A-A-A-A-A
A-A-B-A-A-A-A
A-A-A-B-A-A-A
A-B-A-A-A-B-A.

In the above-described exemplary film structures, each of the gas-permeable barrier film layers A may include two or more gas-permeable barrier film layers in order to better control other film properties, such as the ability to bond to nonwovens. For example, when there are two gas-permeable barrier film layers in one A gas-permeable barrier film layer, and when C represents the second gas-permeable barrier film layer, some exemplary film structures are as follows:

A-C-B-C-A
A-C-A-C-B-C-A
A-C-B-C-A-C-A
A-C-A-C-B-C-A-C-A
A-C-B-C-A-C-A-C-A
A-C-B-C-A-B-C-A

Additionally, die technology that allows production of multiple layers in a multiplier fashion may be used. For example, an ABA structure may be multiplied from about 10 to about 1000 times. The resulting 10-time multiplied ABA structure may be expressed as follows:
A-B-A-A-B-A-A-B-A-A-B-A-A-B-A-A-B-A-A-B-
  A-A-B-A-A-B-A The basis weight of a gas-permeable barrier film 2 or a multi-layer gas permeable film 56 in accordance with the present disclosure may be varied based on a desired Gurley porosity. In one example, a gas-permeable barrier film 2 in accordance with the present disclosure (or a multi-layer gas permeable film 56 containing two or more gas-permeable film layers in accordance with the present disclosure) has a basis weight of less than about 100 gsm and a Gurley porosity of less than about 330 seconds. In another example, a gas-permeable barrier film 2 in accordance with the present disclosure (or a multi-layer gas permeable film 56 containing two or more gas-permeable film layers in accordance with the present disclosure) has a basis weight of less than about 90 gsm and a Gurley porosity of less than about 300 seconds. In a further example, a gas-permeable barrier film 2 in accordance with the present disclosure (or a multi-layer gas permeable film 56 containing two or more gas-permeable film layers in accordance with the present disclosure) has a basis weight of less than about 80 gsm and a Gurley porosity of less than about 280 seconds. In a further example, a gas-permeable barrier film 2 in accordance with the present disclosure (or a multi-layer gas permeable film 56 containing two or more gas-permeable film layers in accordance with the present disclosure) has a basis weight of between about 60 gsm and about 90 gsm and a Gurley porosity of less than about 250 seconds. In a further example, a gas-permeable barrier film 2 in accordance with the present disclosure (or a multi-layer gas permeable film 56 containing two or more gas-permeable film layers in accordance with the present disclosure) has a basis weight of between about 70 gsm and about 80 gsm and a Gurley porosity of less than about 300 seconds. In a further example, a gas-permeable barrier film 2 in accordance with the present disclosure (or a multi-layer gas permeable film 56 containing two or more gas-permeable film layers in accordance with the present disclosure) has a basis weight of between about 70 gsm and about 80 gsm and a Gurley porosity of less than about 220 seconds. In a further example, a gas-permeable barrier film 2 in accordance with the present disclosure (or a multi-layer gas permeable film 56 containing two or more gas-permeable film layers in accordance with the present disclosure) has a basis weight of about 75 gsm and a Gurley porosity of less than about 300 seconds.

Representative applications of a gas-permeable barrier film 2 and/or a multi-layer gas-permeable barrier film 56 in accordance with the present disclosure include applications involving a high gas transmission rate coupled with moisture and/or microbial barrier properties. These representative applications include but are not limited to the manufacture of articles that were heretofore formed almost exclusively from porous webs (e.g., sterilizable packages for medical devices and/or pharmaceutical agents; garments such as coveralls, medical gowns, and the like; building construction materials such as house wraps; etc.).

Representative applications using a microporous gas-permeable film 2 and/or a multi-layer gas-permeable barrier film 56 include but are not limited to medical gowns, diaper back sheets, drapes, packaging, garments, articles, carpet backing, upholstery backing, bandages, protective apparel, feminine hygiene, building construction, bedding, and/or the like. Films in accordance with the present disclosure may be laminated to a fabric, scrim, or other film support by thermal, ultrasonic, and/or adhesive bonding. The support may be attached to at least one face of the film and or to both faces of the film. The laminate may be made using wovens, knits, nonwovens, paper, netting, or other films. Adhesive bonding may be used to prepare such laminates. Adhesive bonding may be performed with adhesive agents such as powders, adhesive webs, liquid, hot-melt and solvent-based adhesives. Additionally, these types of support may be used with ultrasonic or thermal bonding if the polymers in the support are compatible with the film surface. Laminates of the present multilayer films and nonwoven fabrics may provide surgical barriers. In one example, the fabrics are spunbonded or spunbond-meltblown-spunbond (SMS) fabrics. In another example, the fabrics may be spunlaced, airlaid, powder-bonded, thermal-bonded, or resin-bonded.

Figure 10:
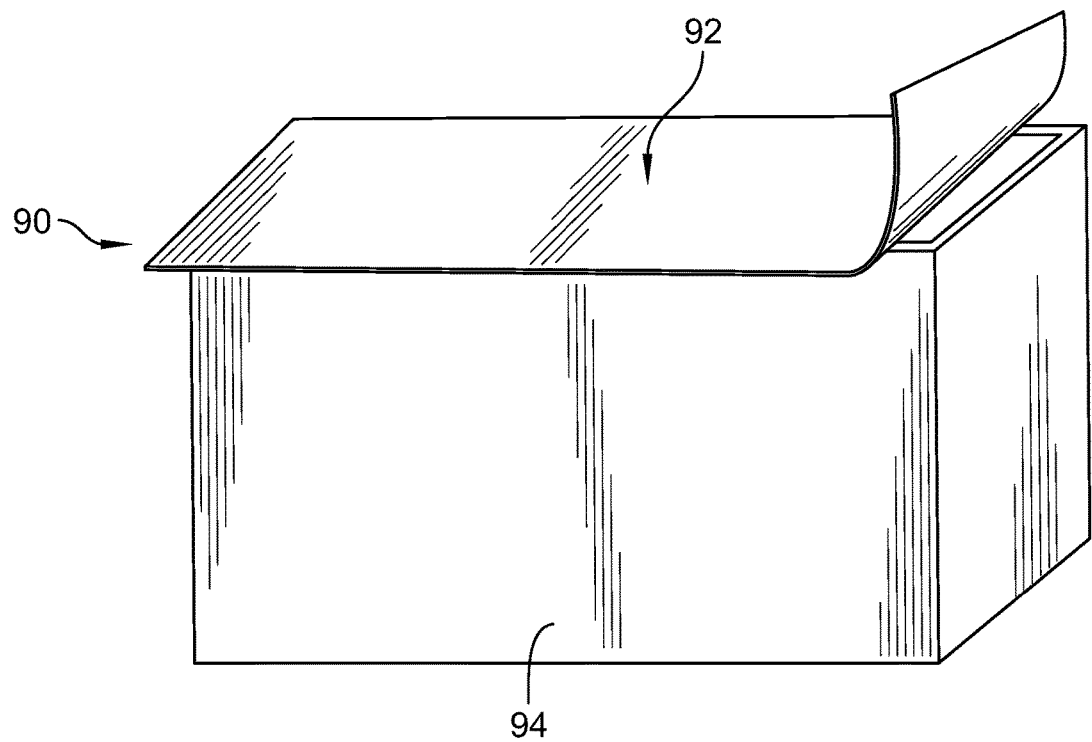
FIG. 10 is a diagrammatic view of a representative embodiment of a sterilizable package.

Gas-permeable barrier layers 2 and/or multi-layer gas-permeable barrier films 56 in accordance with the present disclosure may be used in applications in the medical field. Porous webs are used currently in the medical field for ethylene oxide (EtO) sterilization as the gas must be able to permeate packaging in order to sterilize the contents. These porous webs are often used as the top sheets for rigid trays and as breather films in pouches. Medical paper is commonly used for these purposes as is the flashspun high density polyethylene sold under the trade name TYVEK. The gas-permeable barrier films 2 and/or multi-layer gas-permeable barrier films 56 in accordance with the present disclosure may be used to replace either of these products in such applications. For example, as shown in FIG. 10, a sterilizable package 90 may include a gas-permeable barrier film and/or multi-layer gas-permeable barrier film in accordance with the present disclosure as a breathable top sheet 92 to cover a rigid container 94. The sterilizable package 90 may be used to contain a material to be sterilized (e.g., a medical device, pharmaceutical agent, and/or the like).

In one example, gas-permeable barrier films 2 and/or multi-layer gas-permeable barrier films 56 in accordance with the present disclosure may be used in any application that involves a blood barrier. For example, disposable blankets, operating table covers, or surgical drapes may incorporate a gas-permeable barrier film 2 and/or a multilayer gas-permeable barrier film 56 in accordance with the present disclosure, as they represent blood barrier applications that might function more comfortably with a breathable substrate.

In some embodiments, as described above, the present disclosure provides gas-permeable barrier films 2 and multi-layer gas-permeable barrier films 56. In other embodiments, the present disclosure further provides garments containing one or more gas-permeable barrier films and/or one or more multi-layer gas-permeable barrier films in accordance with the present disclosure. In illustrative embodiments, a garment in accordance with the present disclosure includes at least one gas-permeable barrier film 2 and/or multi-layer gas-permeable barrier film 56 prepared by a process as described above and, optionally, at least one additional layer (which, in some examples, may be a non-woven layer).

In one example, the at least one inner gas-permeable barrier film 2 and/or multi-layer gas-permeable barrier film 56 is bonded to the at least one outer non-woven layer without an adhesive (e.g., via heat sealing, ultrasonic welding, and/or the like). In some embodiments, each of the at least one inner gas-permeable barrier film 2 and/or multi-layer gas-permeable barrier film 56 and the at least one outer non-woven layer comprises polypropylene and/or polyethylene.

In illustrative embodiments, the garment in accordance with the present disclosure is configured as a coverall or surgical gown.

The following examples and representative procedures illustrate features in accordance with the present disclosure, and are provided solely by way of illustration. They are not intended to limit the scope of the appended claims or their equivalents.

EXAMPLES

General

For production of the example films, an extrusion cast line with up to 3 extruders was used. The "A" and "B" extruders are 2½" in diameter, and the "C" extruder is 1¾" in diameter. The extruders feed into a combining feedblock manufactured by Cloeren Corporation of Orange, Tex., which can layer the A, B and C extruder outputs in a variety of configurations. From the feedblock, the molten polymer proceeds into a monolayer cast die (manufactured by Cloeren) that is about 36" wide. The die has an adjustable gap. For the samples described herein, the adjustable gap was maintained between 10 and 40 mils. The molten polymer drops down to a chill roll. For the samples described herein, the chill roll had an embossed pattern FST-250 which was engraved by Pamarco of Roselle, N.J. as their pattern P-2739. The embossed pattern P-2739 is a square pattern (e.g., with lines nearly aligned with the Machine Direction) with 250 squares per inch and a depth of about 31 microns. The roll itself has an 18" diameter with internal water cooling. The engrave roll pattern may be replaced with other patterns that are shallow enough not to interfere with a vacuum box quench. One alternative is a 40 Ra pattern (40 micro-inch average roughness) generated by a sand-blasting process on a chrome plated roll.

Gurley Porosity Testing

Gurley Porosity is measured according to the procedure described in the "Air Resistance of Paper (Gurley Method)" test method published as TAPPI test method "T 460 om-11" by TAPPI (Technical Association of the Pulp and Paper Industry).

Example 1

Polypropylene-Based Monolayer Gas-Permeable Barrier Films

In this experiment, mono-layer gas-permeable barrier films were made from the formulation XC1-8-2271.0 shown in Table 1.

TABLE 1

Composition of XC1-8-2271.0.

| EXTRUDER | Layer % (Total) | COMPONENT | Amount of Component (Weight %) |
|---|---|---|---|
| B | 100 | T1000J2 (Heritage Plastics, CaCO$_3$) | 60 |
|  |  | C702-20 (Braskem, Impact Copolymer Polypropylene) | 40 |

The composition of the CaCO$_3$-containing compound T1000J2 shown in Table 1 is specified in Table 2 below.

TABLE 2

Composition of CaCO$_3$ Compounds used in the Formulation of Table 1.

| Component | T1000J2 (Heritage Plastics) Amount of Component |
|---|---|
| C702-20 | 30 |
| FilmLink 500 (CaCO$_3$) | 70 |
| antioxidant | 0.15 |

Additional gas-permeable barrier films were made from the formulation XC1-8-2271.1 shown in Table 3 below. The composition of the CaCO$_3$-containing compound T1000J2 shown in Table 3 is the same as that specified in Table 2 above.

TABLE 3

Composition of XC1-8-2271.1.

| EXTRUDER | Layer % (Total) | COMPONENT | Amount of Component (Weight %) |
|---|---|---|---|
| B | 100 | T1000J2 | 70 |
|  |  | C702-20 | 30 |

The molten web formed by extrusion of the formulation XC1-8-2271.0 shown in Table 1 and formulation XC1-8-2271.1 shown in Table 3 was quenched by a chill cast vacuum box process in accordance with the present disclosure on a FST-250 roll. The resultant films were subjected to varying degrees of CD IMG stretching and post-stretching according to the conditions summarized in Table 4 below. Films A through D were made from the formulation XC1-8-2271.0 and films E through H were made from the formulation XC1-8-2271.1.

TABLE 4

Conditions For Stretching Films Prepared from XC1-8-2271.0 and XC1-8-2271.1 Formulations.

| FORMULATION | FILM | BASIS WEIGHT (gsm) | CD IMG Depth (inches) | Post-Stretching (%) |
|---|---|---|---|---|
| XC1-8-2271.0 | A | 25 | 0.06 | 0 |
|  | B | 25 | 0.06 | 30 |
|  | C | 25 | 0.08 | 0 |
|  | D | 25 | 0.08 | 30 |
| XC1-8-2271.1 | E | 25 | 0.06 | 0 |
|  | F | 25 | 0.06 | 30 |
|  | G | 25 | 0.08 | 0 |
|  | H | 25 | 0.08 | 30 |

The Gurley porosity of each of films A through H was measured in duplicate as shown in Table 5 below.

TABLE 5

Gurley Porosity of Films Prepared from XC1-8-2271.0 and XC1-8-2271.1 Formulations.

| FORMULATION | FILM | GURLEY POROSITY (seconds) | | |
|---|---|---|---|---|
| | | Run 1 | Run 2 | Average |
| XC1-8-2271.0 (60%) | A | 8190.3 | 7650.7 | 7920.5 |
| | B | 1215.9 | 1268.2 | 1242.05 |
| | C | 1066 | 1222.2 | 1144.1 |
| | D | 557.1 | 517.8 | 537.45 |
| XC1-8-2271.1 (70%) | E | 1778.4 | 1625.9 | 1702.15 |
| | F | 557.3 | 589.6 | 573.45 |
| | G | 725.8 | 540.7 | 633.25 |
| | H | 271.8 | 294.5 | 283.15 |

The data in Tables 4 and 5 show that each of (a) using higher levels of $CaCO_3$ filler, (b) increasing the depth of CD IMG engagement, and (c) incorporating a post-stretch following CD IMG stretching substantially improved the Gurley porosity of the corresponding films. As shown in Table 5, film H exhibited an average Gurley porosity of only 283.15 seconds. A sample of TYVEK obtained from a Cardinal header bag was measured under analogous conditions and exhibited an average Gurley porosity of 26.2 seconds (three runs: 31.3, 23.0, and 24.3 seconds).

Example 2

Polypropylene-Based Gas-Permeable Barrier Films Prepared by Co-Extrusion

Ten three-layer gas-permeable barrier films Nos. 1-10 were made by co-extrusion of the formulation XC3-888-2308 shown in Table 6. Each of the films 1-10 had a basis weight of 75 gsm.

TABLE 6

Composition of XC3-888-2308.

| EXTRUDER | Layer % (Total) | COMPONENT | Amount of Component (Weight %) |
|---|---|---|---|
| C* | 20 | T1000J2 | 70.0 |
| | | 5571 (Total S. A., high impact copolymer polypropylene) | 29.0 |
| | | 102823 (Ampacet, fluoroelastomer processing aid) | 1.0 |
| B** | 60 | T1000J2 | 70.0 |
| | | 5571 | 30.0 |
| C*** | 20 | T1000J2 | 70 |
| | | 5571 | 29.0 |
| | | 102823 | 1.0 |

*Air knife side
**Core
***Vacuum box side

An additional ten three-layer gas-permeable barrier films Nos. 11-20 were made by co-extrusion of the formulation XC3-888-2309 shown in Table 7. Each of the films 11-20 had a basis weight of 75 gsm.

TABLE 7

Composition of XC3-888-2309.

| EXTRUDER | Layer % (Total) | COMPONENT | Amount of Component (Weight %) |
|---|---|---|---|
| C* | 20 | T1000J2 | 70.0 |
| | | 3571 (Total S. A., homopolymer polypropylene) | 29.0 |
| | | 102823 | 1.0 |
| B** | 60 | T1000J2 | 70.0 |
| | | 3571 | 30.0 |
| C*** | 20 | T1000J2 | 70 |
| | | 3571 | 29.0 |
| | | 102823 | 1.0 |

*Air knife side
**Core
***Vacuum box side

Two additional three-layer gas-permeable barrier films Nos. 21-22 were made by co-extrusion of the formulation XC3-888-2310 shown in Table 8. Each of the films 21 and 22 had a basis weight of 75 gsm.

TABLE 8

Composition of XC3-888-2310.

| EXTRUDER | Layer % (Total) | COMPONENT | Amount of Component (Weight %) |
|---|---|---|---|
| C* | 20 | T1000J2 | 70.0 |
| | | C702-20 | 29.0 |
| | | 102823 | 1.0 |
| B** | 60 | T1000J2 | 70.0 |
| | | C702-20 | 30.0 |
| C*** | 20 | T1000J2 | 70 |
| | | C702-20 | 29.0 |
| | | 102823 | 1.0 |

*Air knife side
**Core
***Vacuum box side

The composition of the $CaCO_3$-containing compound T1000J2 shown in each of Tables 6, 7, and 8 is the same as that specified in Table 2 above.

The molten web formed by extrusion of the formulation XC3-888-2308 shown in Table 6 was quenched by a chill cast vacuum box process in accordance with the present disclosure. The resultant films 1-10 were subjected to varying degrees of pre-stretching, CD IMG stretching, and/or post-stretching according to the conditions summarized in Table 9 below.

TABLE 9

Conditions For Stretching Films Prepared from XC3-888-2308 Formulation.

| | FILM NO. | | | | | | | | | |
|---|---|---|---|---|---|---|---|---|---|---|
| | 1 | 2 | 3 | 4 | 5 | 6 | 7 | 8 | 9 | 10 |
| PRE-STRETCH[†] (%) | 0 | 90/90 | 0 | 0 | 0 | 0 | 0 | 0 | 0 | 45/45 |
| CD IMG (inches) | 0.06 | 0.06 | 0.10 | 0.06 | 0.10 | 0.06 | 0.10 | 0.06 | 0.10 | 0.80 |
| MD IMG (%) | 0 | 0 | 0 | 10/10 | 10/10 | 0 | 0 | 10/10 | 10/10 | 5/5 |
| POST-STRETCH (%) | 0 | 0 | 0 | 0 | 0 | 60 | 60 | 60 | 60 | 30 |
| STRETCH TEMP. (° F.) | | | | | | 200 | | | | |
| ANNEALING TEMP. (° F.) | | | | | | 200 | | | | |

[†]Pre-stretching is done until tiger striping is gone.

The molten web formed by extrusion of the formulation XC3-888-2309 shown in Table 7 was quenched by a chill cast vacuum box process in accordance with the present disclosure. The resultant films 11-20 were subjected to varying degrees of pre-stretching, CD IMG stretching, and/or post-stretching according to the conditions summarized in Table 10 below.

TABLE 10

Conditions For Stretching Films Prepared from XC3-888-2309 Formulation.

| | FILM NO. | | | | | | | | | |
|---|---|---|---|---|---|---|---|---|---|---|
| | 11 | 12 | 13 | 14 | 15 | 16 | 17 | 18 | 19 | 20 |
| PRE-STRETCH[†] (%) | 0 | 90/90 | 0 | 0 | 0 | 0 | 0 | 0 | 0 | 45/45 |
| CD IMG (inches) | 0.06 | 0.06 | 0.10 | 0.06 | 0.10 | 0.06 | 0.10 | 0.06 | 0.10 | 0.80 |
| MD IMG (%) | 0 | 0 | 0 | 10/10 | 10/10 | 0 | 0 | 10/10 | 10/10 | 5/5 |
| POST-STRETCH (%) | 0 | 0 | 0 | 0 | 0 | 60 | 60 | 60 | 60 | 30 |
| STRETCH TEMP. (° F.) | | | | | | 200 | | | | |
| ANNEALING TEMP. (° F.) | | | | | | 200 | | | | |

[†]Pre-stretching is done until tiger striping is gone.

The molten web formed by extrusion of the formulation XC3-888-2310 shown in Table 8 was quenched by a chill cast vacuum box process in accordance with the present disclosure. The resultant films 21 and 22 were subjected to varying degrees of pre-stretching, CD IMG stretching, and/or post-stretching according to the conditions summarized in Table 11 below.

TABLE 11

Conditions For Stretching Films Prepared from XC3-888-2310 Formulation.

| | FILM NO. 21 | FILM NO. 22 |
|---|---|---|
| PRE-STRETCH[†] (%) | 0 | 45/45 |
| CD IMG (inches) | 0.08 | 0.08 |
| MD IMG (%) | 5/5 | 5/5 |
| POST-STRETCH (%) | 30 | 30 |
| STRETCH TEMP. (° F.) | 200 | |
| ANNEALING TEMP. (° F.) | 200 | |

[†]Pre-stretching is done until tiger striping is gone.

Example 3

Polypropylene-Based Gas-Permeable Barrier Films Prepared by Co-Extrusion

A gas-permeable barrier film was made by co-extrusion of the formulation XC3-888-2318-2/B shown in Table 12.

TABLE 12

Composition of XC3-888-2318-2/B.

| EXTRUDER | Layer % (Total) | COMPONENT | Amount of Component (Weight %) |
|---|---|---|---|
| C* | 20 | T1000J2 | 70.0 |
| | | C702-20 | 29.0 |
| | | 102823 | 1.0 |
| B** | 60 | T1000J2 | 70.0 |
| | | C702-20 | 30.0 |
| C*** | 20 | T1000J2 | 70 |
| | | C702-20 | 29.0 |
| | | 102823 | 1.0 |

*Air knife side
**Core
***Vacuum box side

The film prepared from formulation XC3-888-2318-2/B was CD IMG stretched at a depth of engagement of a 0.14 inch, followed by 100% post-stretching. The stretching temperature and the annealing temperature were 200° F., and the basis weight of the resultant film was 75 gsm. The Gurley porosity of the resultant film (100 cc, 20 oz.) was 182 seconds, and the moisture vapor transmission rate (MVTR) was 23,114 g/(m²*day). Additional physical properties of the resultant film are summarized in Table 14 below.

Another gas-permeable barrier film was made by co-extrusion of the formulation XC3-888-2318-11/L shown in Table 13.

TABLE 13

Composition of XC3-888-2318-11/L.

| EXTRUDER | Layer % (Total) | COMPONENT | Amount of Component (Weight %) |
|---|---|---|---|
| C* | 20 | T1000J2 | 70.0 |
| | | 5571 | 29.0 |
| | | 102823 | 1.0 |
| B** | 60 | T1000J2 | 70.0 |
| | | 5571 | 30.0 |
| C*** | 20 | T1000J2 | 70 |
| | | 5571 | 29.0 |
| | | 102823 | 1.0 |

*Air knife side
**Core
***Vacuum box side

The film prepared from formulation XC3-888-2318-11/L was CD IMG stretched at a depth of engagement of a 0.14 inch, followed by 100% post-stretching. The stretching temperature and the annealing temperature were 200° F., and the basis weight of the resultant film was 75 gsm. The Gurley porosity of the resultant film (100 cc, 20 oz.) was 163 seconds, and the MVTR was 19,727 g/(m²*day). Additional physical properties of the resultant film are summarized in Table 14 below.

TABLE 14

Physical Properties of Polypropylene-Based Gas-permeable Barrier Films Prepared From Formulations XC3-888-2318-2/B and XC3-888-2318-11/L.

| Physical Properties | Units | XC3-888-2318-2/B | XC3-888-2318-11/L |
|---|---|---|---|
| Gauge | mil | 2.20 | 2.10 |
| Basis Weight | g/m² | 75.0 | 57.2 |
| Density | g/cc | 1.34 | — |
| Light Transmission | % | 7.6 | 7.6 |
| WVTR 100K | g/(m²*day) | 23,114 | 19,727 |
| Tensile Gauge MD | mil | 2.20 | 2.10 |
| Stress @ Peak MD | PSI | 3,568 | 4,241 |
| Strain @ Peak MD | % | 136 | 177 |
| Stress @ Break MD | PSI | 3,566 | 4,241 |
| Strain @ Break MD | % | 136 | 177 |
| Stress @ Yield MD | PSI | 3,343 | 3,709 |
| Strain @ Yield MD | % | 10 | 12 |
| Stress @ 5% Strain MD | PSI | 2,663 | 2,683 |
| Stress @ 10% Strain MD | PSI | 3,373 | 3,583 |
| Stress @ 25% Strain MD | PSI | 3,404 | 3,753 |
| Stress @ 50% Strain MD | PSI | 3,367 | 3,677 |
| Stress @ 100% Strain MD | PSI | 3,453 | 3,784 |
| TEA MD | FtLb/in² | 760 | 1,116 |
| Elmendorf Tear MD Arm | g | 200 | 200 |
| Elmendorf Tear MD | gf | 18.2* | 21.6* |
| Tensile Gauge TD | mil | 2.20 | 2.10 |
| Stress @ Peak TD | PSI | 2,923 | 3,248 |
| Strain @ Peak TD | % | 141 | 212 |
| Stress @ Break TD | PSI | 2,923 | 3,244 |
| Strain @ Break TD | % | 141 | 212 |
| Stress @ Yield TD | PSI | 1,092 | 1,158 |
| Strain @ Yield TD | % | 13 | 16 |
| Stress @ 5% Strain TD | PSI | 588 | 588 |
| Stress @ 10% Strain TD | PSI | 905 | 908 |
| Stress @ 25% Strain TD | PSI | 1,626 | 1,518 |
| Stress @ 50% Strain TD | PSI | 2,342 | 2,227 |
| Stress @ 100% Strain TD | PSI | 2,731 | 2,677 |
| TEA TD | FtLb/in² | 540 | 881 |
| Elmendorf Tear TD Arm | g | 200 | 200 |
| Elmendorf Tear TD | gf | 61 | 83 |
| Dart Drop (26") | g | 230 | 283 |
| § Slow Puncture - ¼" (D3) | gf | 1,750 | 1,876 |

*For reference only.

Example 4

Polypropylene-Based Gas-Permeable Barrier Films Prepared by Co-Extrusion

Figure 11:
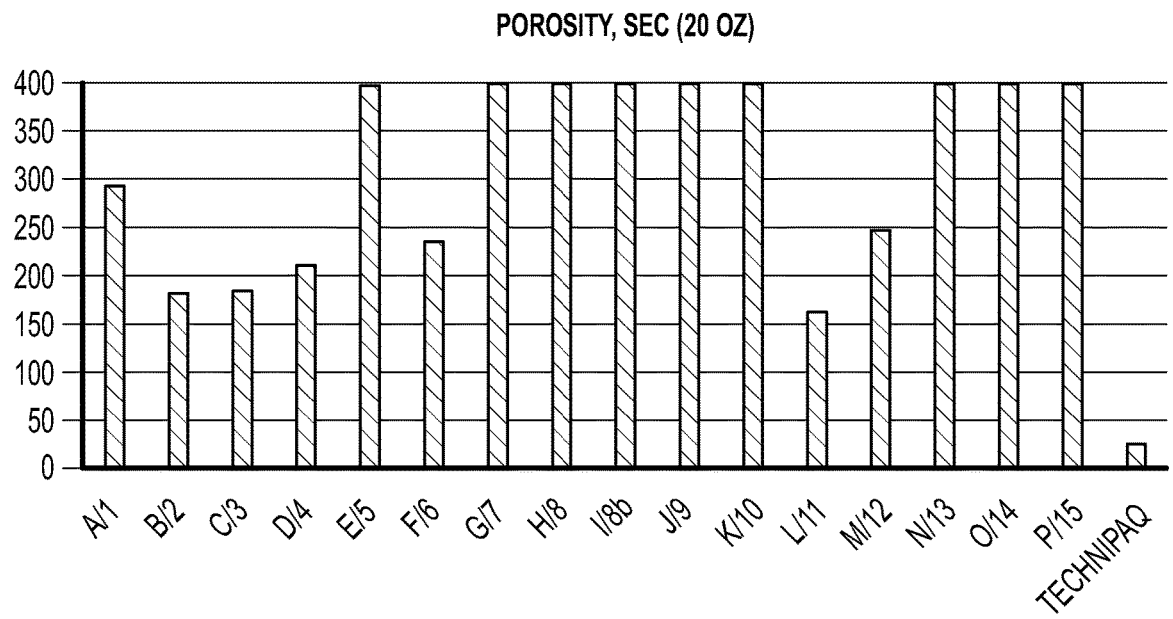
FIG. 11 is a bar graph showing averages of Gurley porosities measured for a series of polypropylene-based gas-permeable barrier films.

Sixteen three-layer gas-permeable barrier films were made by co-extrusion of the formulations shown in Table 15. The film B/2 formed from formulation XC3-888-2318-2 is the same as the film formed from formulation XC3-888-2318-2/B shown in Table 12 of Example 3. Similarly, the film L/11 formed from formulation XC3-888-2318-11 is the same as the film formed from formulation XC3-888-2318-11/L shown in Table 13 of Example 3. The Gurley porosity testing was done in triplicate using a 20-oz. cylinder and a 110 cc timer. For reference, the average Gurley porosity of a TYVEK peelable pouch sample from TECHNIPAQ was determined to be 26 seconds. FIG. 11 shows a bar graph of the average Gurley porosities determined for the films A/1 through P/15 listed in Table 15.

TABLE 15

Compositions and Stretching Conditions for Films A/1 Through P/15 and their Corresponding Gurley Porosities.

| FORMULATION | FILM | CaCO₃ COMPOUND | POLYPROPYLENE RESIN | CD IMG (inches) | POST-STRETCH (%) | GURLEY RUN 1 (seconds) | GURLEY RUN 2 (seconds) | GURLEY RUN 3 (seconds) | GURLEY AVERAGE (seconds) |
|---|---|---|---|---|---|---|---|---|---|
| XC3-888-2318-1 | A/1 | T1000J2 | C702-20 | 0.14 | 20 | 366 | 398 | 119 | 294 |
| XC3-888-2318-2 | B/2 | T1000J2 | C702-20 | 0.14 | 100 | 186 | 165 | 197 | 182 |
| XC3-888-2318-3 | C/3 | T1000D4 | C702-20 | 0.14 | 20 | 213 | 172 | 169 | 185 |
| XC3-888-2318-4 | D/4 | T1000D4 | C702-20 | 0.14 | 100 | 151 | 237 | 252 | 213 |
| XC3-888-2318-5 | E/5 | T1000E4 | C702-20 | 0.14 | 20 | 613 | 643 | 790 | 682 |
| XC3-888-2318-6 | F/6 | T1000E4 | C702-20 | 0.14 | 100 | 224 | 246 | 237 | 236 |
| XC3-888-2318-7 | G/7 | PF97N | C702-20 | 0.14 | 20 | 1,734 | 1,611 | 1,312 | 1,552 |
| XC3-888-2318-8 | H/8 | PF97N | C702-20 | 0.14 | 100 | 729 | 1,007 | 1,017 | 918 |
| XC3-888-2318-8b | I/8b | PF97N | C702-20 | 0.14 | 100 | 1,005 | 874 | 692 | 857 |
| XC3-888-2318-9 | J/9 | PF97 | C702-20 | 0.14 | 20 | 1,900 | 2,700 | 3,857 | 2,819 |
| XC3-888-2318-10 | K/10 | PF97 | C702-20 | 0.14 | 100 | 1,782 | 1,046 | 1,030 | 1,286 |
| XC3-888-2318-11 | L/11 | T1000J2 | 5571 | 0.14 | 100 | 133 | 143 | 214 | 163 |
| XC3-888-2318-12 | M/12 | T1000D4 | 5571 | 0.14 | 100 | 253 | 273 | 220 | 249 |
| XC3-888-2318-13 | N/13 | T1000E4 | 5571 | 0.14 | 100 | 478 | 553 | 494 | 508 |
| XC3-888-2318-14 | O/14 | PF97N | 5571 | 0.14 | 100 | 935 | 1,214 | 912 | 1,020 |
| XC3-888-2318-15 | P/15 | PF97 | 5571 | 0.14 | 100 | 1,065 | 1,240 | 1,384 | 1,229 |

The composition of the CaCO₃-containing compound T1000J2 shown in Table 15 is the same as that specified in Table 2 above. The compositions of the other CaCO₃ compounds in Table 15 are shown below in Table 16.

TABLE 16

Composition of CaCO₃ Compounds used in the Formulations of Table 15.

| Component | T1000D4 (Heritage Plastics) Amount of Component (weight %) | T1000E4 (Heritage Plastics) Amount of Component (weight %) | PN 97 N (A. Schulman) Amount of Component (weight %) | PN 97 (A. Schulman) Amount of Component (weight %) |
|---|---|---|---|---|
| FilmLink 500 (CaCO₃) | 70.0 | | | |
| CaCO₃ (1.5 mkm particle size) | | 70 | | |
| CaCO₃ (3.0 mkm particle size) | | | | 70 |
| CaCO₃ (3.0 micron particle size) | | 70.0 | | |
| C702-20 (Braskem) | 29.9 (400 mesh screens) | 29.9 | | |
| 5571 (Total) | | | | |
| HPP (A. Schulman) | | | 30 | 30 |
| antioxidant | 0.1 | 0.1 | | |

The physical properties of the films A/1 through H/8 are summarized in Table 17, and the physical properties of the films I/8b through P/15 are summarized in Table 18.

TABLE 17

Physical Properties of Polypropylene-Based Gas-Permeable Barrier Films A/1-H/8.

| Physical Properties | Units | A/1 | B/2 | C/3 | D/4 | E/5 | F/6 | G/7 | H/8 |
|---|---|---|---|---|---|---|---|---|---|
| Gauge | mil | 1.92 | 2.20 | 1.88 | 1.84 | 1.90 | 2.08 | 1.93 | 1.83 |
| Basis Weight | g/m² | 68.7 | 75.0 | 67.4 | 63.1 | 67.7 | 71.7 | 68.8 | 63.2 |
| Density | g/cc | 1.409 | 1.340 | 1.411 | 1.346 | 1.405 | 1.355 | 1.403 | 1.355 |
| Emboss Depth | mil | 7.10 | 6.77 | 6.07 | 5.87 | 4.87 | 5.87 | 4.67 | 4.80 |
| Light Transmission | % | 14 | 8 | 13 | 8 | 15 | 10 | 14 | 8 |
| Tensile Gauge MD | mil | 1.92 | 2.20 | 1.88 | 1.84 | 1.90 | 2.08 | 1.93 | 1.84 |
| Tensile @ Peak MD | — | 2,526 | 3,568 | 2,694 | 4,429 | 2,226 | 3,694 | 3,467 | 5,980 |
| Strain @ Peak MD | % | 314 | 136 | 267 | 55 | 250 | 38 | 453 | 210 |
| Tensile @ Break MD | — | 2,522 | 3,566 | 2,693 | 4,395 | 2,226 | 3,644 | 3,463 | 5,980 |
| Strain @ Break MD | % | 315 | 136 | 267 | 115 | 250 | 98 | 453 | 210 |
| Tensile @ Yield MD | — | 2,017 | 3,343 | 2,286 | 2,222 | 1,877 | 1,213 | 2,289 | 4,624 |
| Strain @ Yield MD | % | 8 | 10 | 8 | 4 | 7 | 2 | 9 | 12 |
| Tensile @ 5% Strain MD | — | 1,926 | 2,663 | 2,169 | 3,328 | 1,790 | 2,747 | 2,141 | 3,346 |
| Tensile @ 10% Strain MD | — | 2,016 | 3,373 | 2,286 | 4,287 | 1,883 | 3,554 | 2,290 | 4,415 |
| Tensile @ 25% Strain MD | — | 1,981 | 3,404 | 2,254 | 4,321 | 1,884 | 3,633 | 2,238 | 4,684 |
| Tensile @ 50% Strain MD | — | 1,986 | 3,367 | 2,269 | 4,255 | 1,915 | 3,578 | 2,222 | 4,523 |
| Tensile @ 100% Strain MD | — | 2,045 | 3,453 | 2,339 | 4,362 | 1,980 | 3,637 | 2,242 | 4,720 |
| TEA MD | FtLb/in² | 1,136 | 760 | 1,073 | 806 | 841 | 572 | 1,954 | 1,711 |
| Elmendorf Tear MD Arm | g | 200 | 200 | 200 | 200 | 200 | 200 | 200 | 200 |
| ††††Elmendorf Tear MD | gf | 94.6 | 18.2* | 10.6* | 11.6* | 17* | 13* | 62 | 18.2* |
| Tensile Gauge TD | mil | 1.92 | 2.20 | 1.88 | 1.84 | 1.90 | 2.08 | 1.93 | 1.84 |
| Tensile @ Peak TD | — | 3,415 | 2,923 | 3,096 | 2,902 | 3,246 | 2,645 | 4,836 | 3,532 |
| Strain @ Peak TD | % | 107 | 141 | 81 | 169 | 103 | 132 | 223 | 262 |
| Tensile @ Break TD | — | 3,408 | 2,923 | 3,093 | 2,902 | 3,246 | 2,643 | 4,836 | 3,529 |
| Strain @ Break TD | % | 108 | 141 | 82 | 169 | 103 | 132 | 223 | 262 |
| Tensile @ Yield TD | — | 1,968 | 1,092 | 1,775 | 574 | 2,357 | 575 | 3,298 | 1,055 |
| Strain @ Yield TD | % | 13 | 13 | 10 | 8 | 13 | 7 | 15 | 13 |
| Tensile @ 5% Strain TD | — | 1,124 | 588 | 1,077 | 430 | 1,321 | 449 | 1,954 | 634 |
| Tensile @ 10% Strain TD | — | 1,894 | 905 | 1,794 | 670 | 2,045 | 702 | 2,805 | 932 |
| Tensile @ 25% Strain TD | — | 2,941 | 1,626 | 2,752 | 1,149 | 2,796 | 1,292 | 3,470 | 1,451 |
| Tensile @ 50% Strain TD | — | 3,041 | 2,342 | 2,956 | 1,917 | 2,977 | 2,046 | 3,533 | 2,145 |
| Tensile @ 100% Strain TD | — | 3,326 | 2,731 | 3,269 | 2,586 | 2,711 | 2,512 | 3,790 | 2,694 |
| TEA TD | FtLb/in² | 533 | 540 | 363 | 606 | 484 | 436 | 1,441 | 1,159 |
| Elmendorf Tear TD Arm | g | 200 | 200 | 200 | 200 | 200 | 200 | 400 | 200 |
| ††††Elmendorf Tear TD | gf | 62.6 | 61.4 | 55.4 | 53.6 | 39.8* | 41 | 128.8 | 79.8 |
| Dart Drop (26″) | g | — | 230 | 232 | 202 | 203 | 164 | 251 | 275 |
| § Slow Puncture-Out | gf | 1,492 | 1,750 | 1,416 | 1,530 | 1,399 | 1,505 | 2,181 | 2,177 |
| WVTR 100K | g/(m2*day) | 15,261 | 23,114 | 20,742 | 23,756 | 11,512 | 21,001 | 8,538 | 10,483 |

TABLE 18

Physical Properties of Polypropylene-Based Gas-Permeable Barrier Films I/8b through P/15.

| Physical Properties | Units | I/8b | J/9 | K/10 | L/11 | M/12 | N/13 | O/14 | P/15 |
|---|---|---|---|---|---|---|---|---|---|
| Gauge | mil | 1.84 | 1.88 | 2.10 | 2.10 | 1.82 | 2.09 | 2.02 | 2.04 |
| Basis Weight | g/m² | 65.5 | 63.9 | 74.6 | 57.2 | 65.3 | 72.6 | 72.0 | 70.2 |
| Density | g/cc | 1.404 | 1.339 | 1.396 | — | 1.410 | 1.364 | 1.406 | 1.355 |
| Emboss Depth | mil | 4.93 | 4.63 | 5.63 | 6.03 | 5.87 | 5.80 | 5.37 | 5.50 |
| Light Transmission | % | 9 | 16 | 10 | 8 | 8 | 9 | 8 | 10 |
| Tensile Gauge MD | mil | 1.84 | 1.86 | 2.10 | 2.10 | 1.82 | 2.09 | 2.02 | 2.04 |
| Tensile @ Peak MD | — | 5,441 | 3,296 | 5,439 | 4,241 | 5,044 | 3,833 | 7,843 | 5,964 |
| Strain @ Peak MD | % | 270 | 372 | 219 | 177 | 141 | 163 | 265 | 223 |
| Tensile @ Break MD | — | 5,441 | 3,287 | 5,439 | 4,241 | 5,044 | 3,832 | 7,838 | 5,963 |
| Strain @ Break MD | % | 270 | 372 | 219 | 177 | 141 | 164 | 265 | 223 |
| Tensile @ Yield MD | — | 4,078 | 2,469 | 4,670 | 3,709 | 4,670 | 3,516 | 5,829 | 4,961 |
| Strain @ Yield MD | % | 12 | 10 | 13 | 12 | 11 | 11 | 12 | 13 |
| Tensile @ 5% Strain MD | — | 2,984 | 2,170 | 3,301 | 2,683 | 3,387 | 2,685 | 4,421 | 3,598 |
| Tensile @ 10% Strain MD | — | 3,942 | 2,471 | 4,390 | 3,583 | 4,529 | 3,469 | 5,606 | 4,706 |
| Tensile @ 25% Strain MD | — | 4,067 | 2,453 | 4,677 | 3,753 | 4,759 | 3,552 | 5,824 | 4,978 |
| Tensile @ 50% Strain MD | — | 3,906 | 2,445 | 4,446 | 3,677 | 4,654 | 3,482 | 5,554 | 4,735 |
| Tensile @ 100% Strain MD | — | 3,963 | 2,463 | 4,477 | 3,784 | 4,765 | 3,555 | 5,644 | 4,788 |
| TEA MD | FtLb/in² | 1,945 | 1,659 | 1,694 | 1,116 | 1,095 | 960 | 2,736 | 1,860 |
| Elmendorf Tear MD Arm | g | 200 | 200 | 200 | 200 | 200 | 200 | 200 | 200 |
| ††††Elmendorf Tear MD | gf | 31.4* | 57.6 | 18.2* | 21.6* | 13.8* | 18.8* | 25.2* | 22.6* |
| Tensile Gauge TD | mil | 1.84 | 1.88 | 2.10 | 2.10 | 1.82 | 2.09 | 2.02 | 2.04 |
| Tensile @ Peak TD | — | 4,110 | 4,490 | 3,484 | 3,248 | 3,226 | 3,089 | 3,811 | 3,658 |

TABLE 18-continued

Physical Properties of Polypropylene-Based Gas-Permeable Barrier Films I/8b through P/15.

| Physical Properties | Units | I/8b | J/9 | K/10 | L/11 | M/12 | N/13 | O/14 | P/15 |
|---|---|---|---|---|---|---|---|---|---|
| Strain @ Peak TD | % | 260 | 179 | 222 | 212 | 194 | 182 | 288 | 252 |
| Tensile @ Break TD | — | 4,103 | 4,490 | 3,482 | 3,244 | 3,219 | 3,089 | 3,811 | 3,658 |
| Strain @ Break TD | % | 260 | 179 | 223 | 212 | 194 | 182 | 288 | 252 |
| Tensile @ Yield TD | — | 2,075 | 3,248 | 1,065 | 1,158 | 868 | 774 | 1,194 | 1,225 |
| Strain @ Yield TD | % | 28 | 17 | 13 | 16 | 10 | 9 | 15 | 14 |
| Tensile @ 5% Strain TD | — | 785 | 1,658 | 635 | 588 | 592 | 534 | 704 | 717 |
| Tensile @ 10% Strain TD | — | 1,182 | 2,515 | 944 | 908 | 886 | 805 | 1,011 | 1,045 |
| Tensile @ 25% Strain TD | — | 1,954 | 3,552 | 1,536 | 1,518 | 1,468 | 1,429 | 1,534 | 1,621 |
| Tensile @ 50% Strain TD | — | 2,735 | 3,711 | 2,352 | 2,227 | 2,224 | 2,259 | 2,252 | 2,374 |
| Tensile @ 100% Strain TD | — | 3,121 | 3,943 | 2,955 | 2,677 | 2,757 | 2,774 | 2,850 | 2,939 |
| TEA TD | FtLb/in$^2$ | 1,357 | 1,136 | 1,009 | 881 | 797 | 733 | 1,371 | 1,188 |
| Elmendorf Tear TD Arm | g | 200 | 200 | 200 | 200 | 200 | 200 | 200 | 200 |
| ††††Elmendorf Tear TD | gf | 71 | 53.4 | 73.6 | 83 | 76.2 | 44.8 | 115.6 | 85.8 |
| Dart Drop (26") | g | 340 | 265 | 236 | 283 | 236 | 220 | 414 | 266 |
| § Slow Puncture-Out | gf | 2,255 | 1,731 | 2,226 | 1,876 | 1,784 | 1,767 | 2,760 | 2,317 |
| WVTR 100K | g/(m2*day) | 11,731 | 4,260 | 6,492 | 19,727 | 22,024 | 13,337 | 9,121 | 4,569 |

Figure 12:
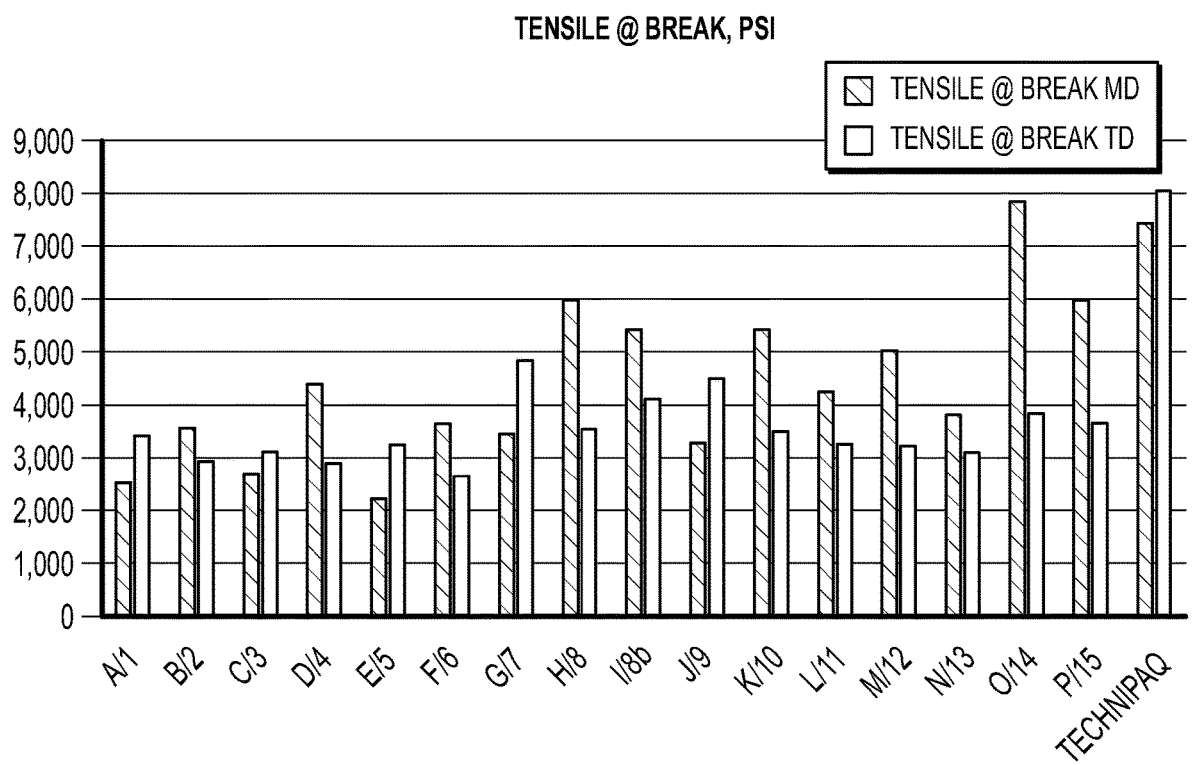
FIG. 12 is a bar graph showing tensile @ break data for a series of polypropylene-based gas-permeable barrier films.
Figure 13:
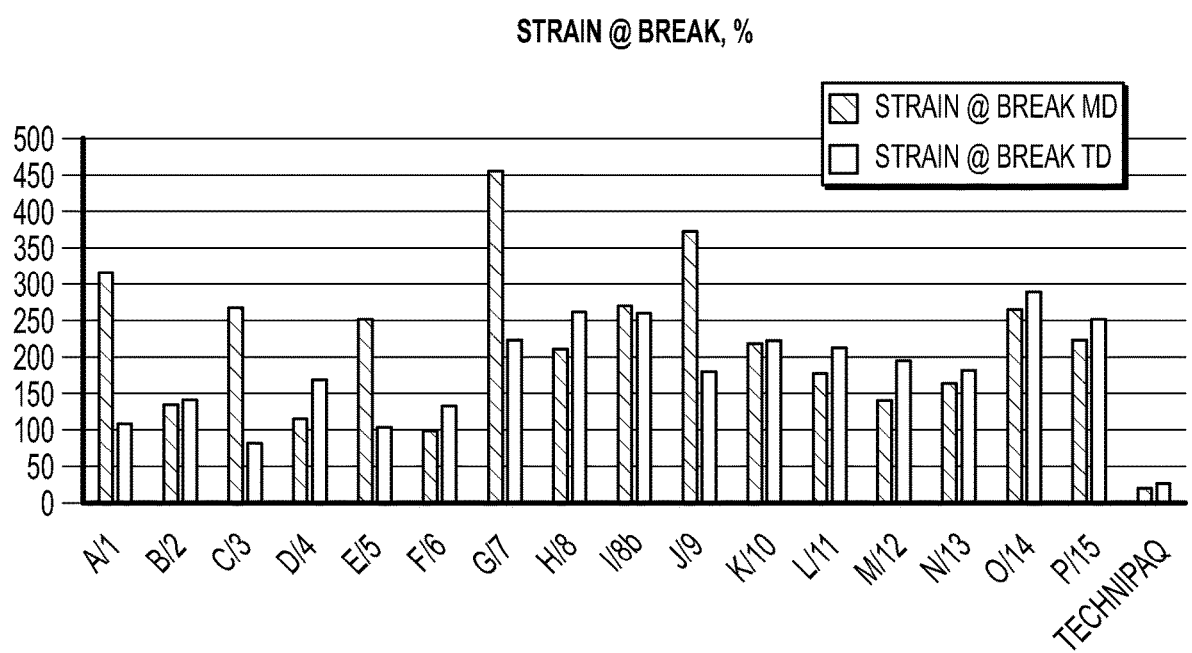
FIG. 13 is a bar graph showing strain @ break data for a series of polypropylene-based gas-permeable barrier films.

FIGS. 12 and 13 show, respectively, bar graphs of tensile @ break and strain @ break for the films A/1 through P/15 listed in Tables 17 and 18. For the sake of comparison, various physical properties for a sample of a TYVEK peelable pouch from TECHNIPAQ are summarized below in Table 19.

TABLE 19

Physical Properties of TECHNIPAQ Sample.

| Physical Properties | Units | |
|---|---|---|
| Light Transmission | % | 18 |
| Tensile @ Break MD | — | 7,418 |
| Strain @ Break MD | % | 20 |
| TEA MD | FtLb/in$^2$ | 138 |
| ††††Elmendorf Tear MD | gf | 357 |
| Tensile @ Break TD | — | 8,040 |
| Strain @ Break TD | % | 26 |
| TEA TD | FtLb/in$^2$ | 204 |
| ††††Elmendorf Tear TD | gf | 344 |
| Dart Drop (26") | g | — |
| Slow Puncture - out | gf | 13,385 |

Example 5

Polyethylene-Based Gas-Permeable Barrier Films Prepared by Co-Extrusion

Four three-layer gas-permeable barrier films Nos. 23-26 were made by co-extrusion of the formulation XC3-222-2315.1-4 shown in Table 20. Each of the films 23-26 had a basis weight of 75 gsm.

TABLE 20

Composition of XC3-222-2315.1-4.

| EXTRUDER | Layer % (Total) | COMPONENT | Amount of Component (Weight %) |
|---|---|---|---|
| C* | 20 | CF7414 (CaCO$_3$) | 70.0 |
| | | EXCEED LL3518 (ExxonMobil, metallocene polyethylene resin, narrow MWD, density = 0.918 g/cm$^3$) | 29.0 |
| | | 102823 | 1.0 |
| B** | 60 | CF7414 | 70.0 |
| | | LL3518 | 30.0 |
| C*** | 20 | CF7414 | 70 |
| | | LL3518 | 29.0 |
| | | 102823 | 1.0 |

*Air knife side
**Core
***Vacuum box side

The composition of the CaCO$_3$-containing formulation (CF7414) listed in Table 20 is specified below in Table 21.

TABLE 21

Composition of the CF7414 Formulation Shown in Table 20.

| Component | Amount of Component |
|---|---|
| EXCEED LL3518 | 28 |
| FilmLink 500 (CaCO$_3$) | 60 |
| TiO$_2$ | 12 |

An additional four three-layer gas-permeable barrier films Nos. 27-30 were made by co-extrusion of the formulation XC3-222-2315.5-8 shown in Table 22. Each of the films 27-30 had a basis weight of 75 gsm.

TABLE 22

Composition of XC3-222-2315.5-8.

| EXTRUDER | Layer % (Total) | COMPONENT | Amount of Component (Weight %) |
|---|---|---|---|
| C* | 20 | CF7414 | 70.0 |
| | | EXCEED LL3404.48 (ExxonMobil, linear low density polyethylene) | 29.0 |
| | | 102823 | 1.0 |
| B** | 60 | CF7414 | 70.0 |
| | | LL3404.48 | 30.0 |

TABLE 22-continued

Composition of XC3-222-2315.5-8.

| EXTRUDER | Layer % (Total) | COMPONENT | Amount of Component (Weight %) |
|---|---|---|---|
| C*** | 20 | CF7414 | 70 |
|  |  | LL3404.48 | 29.0 |
|  |  | 102823 | 1.0 |

*Air knife side
**Core
***Vacuum box side

An additional three-layer gas-permeable barrier film No. 31 was made by co-extrusion of the formulation XC3-222-2315.9 shown in Table 23. The film 31 had a basis weight of 75 gsm.

TABLE 23

Composition of XC3-222-2315.9.

| EXTRUDER | Layer % (Total) | COMPONENT | Amount of Component (Weight %) |
|---|---|---|---|
| C* | 20 | CF7414 | 70.0 |
|  |  | LL3404.48 | 15.0 |
|  |  | 102823 | 1.0 |
|  |  | LL3518 | 14 |
| B** | 60 | CF7414 | 70.0 |
|  |  | LL3404.48 | 15.0 |
|  |  | LL3518 | 15.0 |
| C*** | 20 | CF7414 | 70 |
|  |  | LL3404.48 | 15.0 |
|  |  | 102823 | 1.0 |
|  |  | LL3518 | 14.0 |

*Air knife side
**Core
***Vacuum box side

Three additional three-layer gas-permeable barrier film Nos. 32-34 were made by co-extrusion of the formulation XC3-222-2315.10-12 shown in Table 24. Each of the films 32-34 had a basis weight of 75 gsm.

TABLE 24

Composition of XC3-222-2315.10-12.

| EXTRUDER | Layer % (Total) | COMPONENT | Amount of Component (Weight %) |
|---|---|---|---|
| C* | 20 | CF7414 | 70.0 |
|  |  | L727 (Total S. A., linear low density polyethylene) | 29.0 |
|  |  | 102823 | 1.0 |
| B** | 60 | CF7414 | 70.0 |
|  |  | L727 | 30.0 |
| C*** | 20 | CF7414 | 70 |
|  |  | L727 | 29.0 |
|  |  | 102823 | 1.0 |

*Air knife side
**Core
***Vacuum box side

The composition of the $CaCO_3$-containing compound CF7414 shown in each of Tables 22, 23, and 24 is the same as that specified in Table 21 above.

The molten web formed by extrusion of the formulation XC3-222-2315.1-4 shown in Table 20 was quenched by a chill cast vacuum box process in accordance with the present disclosure. The resultant films 23-26 were subjected to varying degrees of CD IMG stretching and post-stretching according to the conditions summarized in Table 25 below.

TABLE 25

Conditions For Stretching Films Prepared from XC3-222-2315.1-4 Formulation.

| | FILM NO. | | | |
|---|---|---|---|---|
| | 23 | 24 | 25 | 26 |
| CD IMG (inches) | 0.08 | 0.14 | 0.08 | 0.14 |
| POST-STRETCH (%) | 20 | 20 | 100 | 100 |
| STRETCH TEMP. (° F.) | | | 200 | |
| ANNEALING TEMP. (° F.) | | | 200 | |

The molten web formed by extrusion of the formulation XC3-222-2315.5-8 shown in Table 22 was quenched by a chill cast vacuum box process in accordance with the present disclosure. The resultant films 27-30 were subjected to varying degrees of CD IMG stretching and post-stretching according to the conditions summarized in Table 26 below.

TABLE 26

Conditions For Stretching Films Prepared from XC3-222-2315.5-8 Formulation.

| | FILM NO. | | | |
|---|---|---|---|---|
| | 27 | 28 | 29 | 30 |
| CD IMG (inches) | 0.08 | 0.14 | 0.08 | 0.14 |
| POST-STRETCH (%) | 20 | 20 | 100 | 100 |
| STRETCH TEMP. (° F.) | | | 200 | |
| ANNEALING TEMP. (° F.) | | | 200 | |

The molten web formed by extrusion of the formulation XC3-222-2315.9 shown in Table 23 was quenched by a chill cast vacuum box process in accordance with the present disclosure. The resultant film 31 was subjected to varying degrees of CD IMG stretching and post-stretching according to the conditions summarized in Table 27 below.

TABLE 27

Conditions For Stretching Films Prepared from XC3-222-2315.9 Formulation.

| | FILM NO. 31 |
|---|---|
| CD IMG (inches) | 0.11 |
| POST-STRETCH (%) | 60 |
| STRETCH TEMP. (° F.) | 200 |
| ANNEALING TEMP. (° F.) | 200 |

The molten web formed by extrusion of the formulation XC3-222-2315.10-12 shown in Table 24 was quenched by a chill cast vacuum box process in accordance with the present disclosure. The resultant films 32-34 were subjected to varying degrees of CD IMG stretching and post-stretching according to the conditions summarized in Table 28 below.

TABLE 28

Conditions For Stretching Films Prepared from XC3-222-2315.10-12 Formulation.

|  | FILM NO. | | |
|---|---|---|---|
|  | 32 | 33 | 34 |
| CD IMG (inches) | 0.11 | 0.14 | 0.14 |
| POST-STRETCH (%) | 60 | 60 | 100 |
| STRETCH TEMP. (° F.) |  | 200 |  |
| ANNEALING TEMP. (° F.) |  | 200 |  |

A gas-permeable barrier film was made by co-extrusion of the formulation XC3-222-2315.5-8 shown in Table 22 above. The film prepared from formulation XC3-222-2315.5-8 was CD IMG stretched at a depth of engagement of a 0.14 inch, followed by 20% post-stretching. The stretching temperature and the annealing temperature were 200° F., and the basis weight of the resultant film was 75 gsm. The Gurley porosity of the resultant film (100 cc, 20 oz.) was 313 seconds, and the MVTR was 17,953 g/(m$^2$*day). Additional physical properties of the resultant film are summarized in Table 29 below. Another gas-permeable barrier film was made by co-extrusion of the formulation XC3-222-2315.10-12 shown in Table 24 above. The film prepared from formulation XC3-222-2315.10-12 was CD IMG stretched at a depth of engagement of a 0.14 inch, followed by 60% post-stretching. The stretching temperature and the annealing temperature were 200° F., and the basis weight of the resultant film was 75 gsm. The Gurley porosity of the resultant film (100 cc, 20 oz.) was 199 seconds, and the MVTR was 25,522 g/(m$^2$*day). Additional physical properties of the resultant film are summarized in Table 29 below.

TABLE 29

Physical Properties of Polyethylene-Based Gas-permeable Barrier Films Prepared From Formulations XC3-222-2315.5-8 and XC3-222-2315.10-12.

| Physical Properties | Units | XC3-222-2315.5-8 | XC3-222-2315.10-12 |
|---|---|---|---|
| Gauge | mil | 2.09 | 2.07 |
| Basis Weight | g/m$^2$ | 74.2 | 78.0 |
| Density | g/cc | 1.40 | 1.49 |
| Light Transmission | % | 9.7 | 8.7 |
| WVTR 100K | g/(m$^2$*day) | 17,953 | 25,522 |
| Tensile Gauge MD | mil | 2.09 | 2.07 |
| Stress @ Peak MD | PSI | 2,022 | 5,465 |
| Strain @ Peak MD | % | 366 | 283 |
| Stress @ Break MD | PSI | 2,022 | 5,465 |
| Strain @ Break MD | % | 366 | 283 |
| Stress @ Yield MD | PSI | 1,673 | 2,234 |
| Strain @ Yield MD | % | 10 | 14 |
| Stress @ 5% Strain MD | PSI | 1,513 | 1,484 |
| Stress @ 10% Strain MD | PSI | 1,671 | 2,008 |
| Stress @ 25% Strain MD | PSI | 1,670 | 2,559 |
| Stress @ 50% Strain MD | PSI | 1,614 | 2,698 |
| Stress @ 100% Strain MD | PSI | 1,570 | 2,784 |
| TEA MD | FtLb/in$^2$ | 1,023 | 1,568 |
| Elmendorf Tear MD Arm | g | 800 | 400 |
| Elmendorf Tear MD | gf | 534 | 106 |
| Tensile Gauge TD | mil | 2.09 | 2.07 |
| Stress @ Peak TD | PSI | 4,542 | 2,487 |
| Strain @ Peak TD | % | 369 | 537 |

TABLE 29-continued

Physical Properties of Polyethylene-Based Gas-permeable Barrier Films Prepared From Formulations XC3-222-2315.5-8 and XC3-222-2315.10-12.

| Physical Properties | Units | XC3-222-2315.5-8 | XC3-222-2315.10-12 |
|---|---|---|---|
| Stress @ Break TD | PSI | 4,542 | 2,487 |
| Strain @ Break TD | % | 369 | 537 |
| Stress @ Yield TD | PSI | 2,392 | 809 |
| Strain @ Yield TD | % | 25 | 19 |
| Stress @ 5% Strain TD | PSI | 857 | 460 |
| Stress @ 10% Strain TD | PSI | 1,423 | 642 |
| Stress @ 25% Strain TD | PSI | 2,390 | 867 |
| Stress @ 50% Strain TD | PSI | 2,436 | 1,042 |
| Stress @ 100% Strain TD | PSI | 2,353 | 1,338 |
| TEA TD | FtLb/in$^2$ | 1,757 | 1,404 |
| Elmendorf Tear TD Arm | g | 800 | 1,600 |
| Elmendorf Tear TD | gf | 345 | 1,041 |
| Dart Drop (26") | g | 212 | 532 |
| § Slow Puncture - ¼" (D3) | gf | 1,292 | 1,868 |

*For reference only.

Example 6

Multi-Layer Gas-Permeable Barrier Films Prepared by Co-Extrusion of Polypropylene and Polyethylene Three three-layer gas-permeable barrier films Nos. 35-37 were made by co-extrusion of the formulation XC3-828-2290 shown in Table 30. Each of the films 35-37 had a basis weight of 75 gsm.

TABLE 30

Composition of XC3-828-2290.

| EXTRUDER | Layer % (Total) | COMPONENT | Amount of Component (Weight %) |
|---|---|---|---|
| C* | 20 | T1000J2 | 70.0 |
|  |  | C702-20 | 29.0 |
|  |  | 102823 | 1.0 |
| B** | 60 | CF7414 | 70.0 |
|  |  | LL3518 | 30.0 |
| C**** | 20 | T1000J2 | 70 |
|  |  | C702-20 | 29.0 |
|  |  | 102823 | 1.0 |

*Air knife side
**Core
****Cast roll

Three additional three-layer gas-permeable barrier films Nos. 38-40 were made by co-extrusion of the formulation XC3-282-2291 shown in Table 31. Each of the films 38-40 had a basis weight of 75 gsm.

TABLE 31

Composition of XC3-282-2291.

| EXTRUDER | Layer % (Total) | COMPONENT | Amount of Component (Weight %) |
|---|---|---|---|
| C* | 20 | CF7414 | 70.0 |
|  |  | LL3518 | 29.0 |
|  |  | 102823 | 1.0 |
| B** | 60 | T1000J2 | 70.0 |
|  |  | C702-20 | 30.0 |

TABLE 31-continued

Composition of XC3-282-2291.

| EXTRUDER | Layer % (Total) | COMPONENT | Amount of Component (Weight %) |
|---|---|---|---|
| C**** | 20 | CF7414 | 70 |
|  |  | LL3518 | 29.0 |
|  |  | 102823 | 1.0 |

*Air knife side
**Core
****Cast roll

Three additional two-layer gas-permeable barrier film Nos. 41-43 were made by co-extrusion of the formulation XC2-28-2292 shown in Table 32. Each of the films 41-43 had a basis weight of 75 gsm.

TABLE 32

Composition of XC2-28-2292.

| EXTRUDER | Layer % (Total) | COMPONENT | Amount of Component (Weight %) |
|---|---|---|---|
| C* | 20 | CF7414 | 70.0 |
|  |  | LL3518 | 29.0 |
|  |  | 102823 | 1.0 |
| B** | 80 | T1000J2 | 70.0 |
|  |  | C702-20 | 29.0 |
|  |  | 102823 | 1.0 |

*Air knife side
**Core

The composition of the $CaCO_3$-containing formulation T1000J2 and the composition of the $CaCO_3$-containing formulation CF7414 listed in each of Tables 30, 31, and 32 are specified above in Tables 2 and 21, respectively.

The molten web formed by extrusion of the formulation XC3-828-2290 shown in Table 30, the molten web formed by extrusion of the formulation XC3-282-2291 shown in Table 31, and the molten web formed by extrusion of the formulation XC2-28-2292 shown in Table 32 were each quenched by a chill cast vacuum box process in accordance with the present disclosure. The resultant films were subjected to varying degrees of CD IMG stretching and post-stretching according to the conditions summarized in Table 33 below. Films 35 through 39 were made from the formulation XC3-828-2290, films 40 and 41 were made from the formulation XC3-282-2291, and films 42 through 44 were made from the formulation XC2-28-2292.

TABLE 33

Conditions For Stretching Films Prepared from XC3-828-2290, XC3-282-2291, and XC2-28-2292 Formulations.

| FORMULATION | FILM | BASIS WEIGHT (gsm) | CD IMG Depth (mil) | Post-Stretching (%) |
|---|---|---|---|---|
| XC3-828-2290 | 35 | 75 | 0.10 | 0 |
|  | 36 | 75 | 0.14 | 0 |
|  | 37 | 75 | 0.10 | 30 |
|  | 38 | 75 | 0.10 | 60 |
|  | 39 | 75 | 0.14 | 60 |
| XC3-282-2291 | 40 | 75 | 0.10 | 0 |
|  | 41 | 75 | 0.10 | 30 |
| XC2-28-2292 | 42 | 75 | 0.10 | 0 |
|  | 43 | 75 | 0.10 | 30 |
|  | 44 | 75 | 0.10 | 60 |

The Gurley porosity of each of films 35 through 44 was measured in duplicate as shown in Table 34 below.

TABLE 34

Gurley Porosity of Films Prepared from XC3-828-2290, XC3-282-2291, and XC2-28-2292 Formulations.

| FORMULATION | FILM | GURLEY POROSITY (seconds) | | |
|---|---|---|---|---|
|  |  | Run 1 | Run 2 | Average |
| XC3-828-2290 | 35 | 1505.3 | 2709.5 | 2107.4 |
|  | 36 | 1610.1 | 1389.7 | 1499.9 |
|  | 37 | 614.7 | 549.2 | 581.95 |
|  | 38 | 473.8 | 366.8 | 420.3 |
|  | 39 | 122.6 | 587.9 | 355.25 |
| XC3-282-2291 | 40 | 1473.6 | 1634.8 | 1554.2 |
|  | 41 | 772.9 | 819 | 795.95 |
| XC2-28-2292 | 42 | 2095.3 | 1828.2 | 1961.75 |
|  | 43 | 1056.1 | 928.1 | 992.1 |
|  | 44 | 662.9 | 638.8 | 650.85 |

Additional physical properties of the resultant films are summarized in Tables 35-37 below.

TABLE 35

Physical Properties of Gas-permeable Barrier Films Prepared From Formulation XC3-828-2290.

| Physical Properties | Units | FILM NO. | | | | |
|---|---|---|---|---|---|---|
|  |  | 35 | 36 | 37 | 38 | 39 |
| Gauge | mil | 2.10 | 2.01 | 2.23 | 2.41 | 2.54 |
| Basis Weight | g/m² | 76.64 | 71.80 | 81.19 | 86.15 | 94.19 |
| Density | g/cc | 1.4375 | 1.4085 | 1.4312 | 1.4055 | 1.4575 |
| Light Transmission | % | 17.3 | 14.1 | 13.1 | 9.9 | 8.0 |
| WVTR 100K | g/(m²*day) | 4634 | 6326 | 10869 | 11478 | 15068 |
| Tensile Gauge MD | mil | 2.10 | 2.01 | 2.23 | 2.41 | 2.54 |
| Stress @ Peak MD | PSI | 2,426 | 2,204 | 3,286 | 3,321 | 2,658 |
| Strain @ Peak MD | % | 509 | 476 | 399 | 300 | 279 |
| Stress @ Break MD | PSI | 2,426 | 2,200 | 3,286 | 3,321 | 2,658 |
| Strain @ Break MD | % | 509 | 476 | 399 | 300 | 279 |
| Stress @ Yield MD | PSI | 1,585 | 1,440 | 2,059 | 2,034 | 1,810 |

TABLE 35-continued

Physical Properties of Gas-permeable Barrier Films Prepared From Formulation XC3-828-2290.

| Physical Properties | Units | FILM NO. | | | | |
|---|---|---|---|---|---|---|
| | | 35 | 36 | 37 | 38 | 39 |
| Strain @ Yield MD | % | 8 | 10 | 10 | 12 | 12 |
| Stress @ 5% Strain MD | PSI | 1,537 | 1,326 | 1,795 | 1,565 | 1,409 |
| Stress @ 10% Strain MD | PSI | 1,583 | 1,441 | 2,054 | 1,974 | 1,763 |
| Stress @ 25% Strain MD | PSI | 1,530 | 1,437 | 2,085 | 2,143 | 1,925 |
| Stress @ 50% Strain MD | PSI | 1,493 | 1,418 | 2,057 | 2,154 | 1,953 |
| Stress @ 100% Strain MD | PSI | 1,488 | 1,417 | 2,062 | 2,197 | 2,002 |
| TEA MD | FtLb/in$^2$ | 1,464 | 1,283 | 1,570 | 1,219 | 985 |
| Elmendorf Tear MD Arm | g | 800 | 800 | 800 | 200 | 400 |
| Elmendorf Tear MD | gf | 599 | 578 | 274 | 90 | 152 |
| Tensile Gauge TD | mil | 2.10 | 2.01 | 2.23 | 2.41 | 2.54 |
| Stress @ Peak TD | PSI | 2,788 | 3,178 | 2,469 | 2,264 | 2,295 |
| Strain @ Peak TD | % | 397 | 289 | 392 | 417 | 293 |
| Stress @ Break TD | PSI | 2,780 | 3,178 | 2,469 | 2,262 | 2,294 |
| Strain @ Break TD | % | 398 | 289 | 392 | 417 | 293 |
| Stress @ Yield TD | PSI | 1,865 | 2,103 | 1,569 | 1,302 | 1,262 |
| Strain @ Yield TD | % | 26 | 30 | 26 | 27 | 30 |
| Stress @ 5% Strain TD | PSI | 739 | 644 | 623 | 526 | 435 |
| Stress @ 10% Strain TD | PSI | 1,136 | 1,026 | 993 | 825 | 685 |
| Stress @ 25% Strain TD | PSI | 1,853 | 1,918 | 1,558 | 1,272 | 1,145 |
| Stress @ 50% Strain TD | PSI | 1,824 | 2,192 | 1,683 | 1,494 | 1,563 |
| Stress @ 100% Strain TD | PSI | 1,776 | 2,116 | 1,656 | 1,563 | 1,704 |
| TEA TD | FtLb/in$^2$ | 1,328 | 1,111 | 1,192 | 1,180 | 847 |
| Elmendorf Tear TD Arm | g | 1,600 | 800 | 800 | 1,600 | 800 |
| Elmendorf Tear TD | gf | 558 | 451 | 627 | 650 | 325 |
| Dart Drop (26") | g | 338 | 278 | 372 | 386 | 346 |
| § Slow Puncture-¼" (D3) | gf | 1,215 | 1,145 | 1,381 | 1,634 | 1,671 |

TABLE 36

Physical Properties of Gas-permeable Barrier Films Prepared From Formulation XC3-282-2291.

| Physical Properties | Units | FILM NO. | |
|---|---|---|---|
| | | 40 | 41 |
| Gauge | mil | 1.92 | 2.05 |
| Basis Weight | g/m$^2$ | 68.61 | 72.81 |
| Density | g/cc | 1.4033 | 1.3976 |
| Light Transmission | % | 19.7 | 15.1 |
| WVTR 100K | g/(m$^2$*day) | 6166 | 10804 |
| Tensile Gauge MD | mil | 1.92 | 2.05 |
| Stress @ Peak MD | PSI | 2,249 | 3,210 |
| Strain @ Peak MD | % | 446 | 342 |
| Stress @ Break MD | PSI | 2,248 | 3,210 |
| Strain @ Break MD | % | 447 | 342 |
| Stress @ Yield MD | PSI | 1,588 | 2,218 |
| Strain @ Yield MD | % | 7 | 9 |
| Stress @ 5% Strain MD | PSI | 1,586 | 2,024 |
| Stress @ 10% Strain MD | PSI | 1,572 | 2,230 |
| Stress @ 25% Strain MD | PSI | 1,542 | 2,241 |
| Stress @ 50% Strain MD | PSI | 1,528 | 2,220 |
| Stress @ 100% Strain MD | PSI | 1,539 | 2,235 |
| TEA MD | FtLb/in$^2$ | 1,287 | 1,413 |
| Elmendorf Tear MD Arm | g | 200 | 200 |
| Elmendorf Tear MD | gf | 50 | 64 |
| Tensile Gauge TD | mil | 1.92 | 2.03 |
| Stress @ Peak TD | PSI | 2,599 | 2,517 |
| Strain @ Peak TD | % | 301 | 319 |
| Stress @ Break TD | PSI | 2,599 | 2,515 |
| Strain @ Break TD | % | 301 | 319 |
| Stress @ Yield TD | PSI | 2,040 | 1,697 |
| Strain @ Yield TD | % | 19 | 24 |
| Stress @ 5% Strain TD | PSI | 822 | 694 |
| Stress @ 10% Strain TD | PSI | 1,461 | 1,116 |
| Stress @ 25% Strain TD | PSI | 2,026 | 1,723 |
| Stress @ 50% Strain TD | PSI | 1,980 | 1,864 |
| Stress @ 100% Strain TD | PSI | 1,994 | 1,927 |
| TEA TD | FtLb/in$^2$ | 1,056 | 1,070 |

TABLE 36-continued

Physical Properties of Gas-permeable Barrier Films Prepared From Formulation XC3-282-2291.

| Physical Properties | Units | FILM NO. | |
|---|---|---|---|
| | | 40 | 41 |
| Elmendorf Tear TD Arm | g | 800 | 800 |
| Elmendorf Tear TD | gf | 518 | 283 |
| Dart Drop (26") | g | 282 | 319 |
| § Slow Puncture - ¼" (D3) | gf | 1,038 | 1,476 |

TABLE 37

Physical Properties of Gas-permeable Barrier Films Prepared From Formulation XC2-28-2292.

| Physical Properties | Units | FILM NO. | | |
|---|---|---|---|---|
| | | 42 | 43 | 44 |
| Gauge | mil | 2.18 | 2.06 | 1.94 |
| Basis Weight | g/m$^2$ | 75.64 | 73.17 | 67.95 |
| Density | g/cc | 1.3680 | 1.3966 | 1.3755 |
| Light Transmission | % | 22.1 | 15.0 | 14.3 |
| WVTR 100K | g/(m$^2$*day) | 5816 | 10870 | 10928 |
| Tensile Gauge MD | mil | 2.18 | 2.06 | 1.94 |
| Stress @ Peak MD | PSI | 2,285 | 2,955 | 2,931 |
| Strain @ Peak MD | % | 463 | 332 | 238 |
| Stress @ Break MD | PSI | 2,282 | 2,955 | 2,927 |
| Strain @ Break MD | % | 464 | 332 | 238 |
| Stress @ Yield MD | PSI | 1,586 | 2,291 | 2,440 |

TABLE 37-continued

Physical Properties of Gas-permeable Barrier Films Prepared From Formulation XC2-28-2292.

| Physical Properties | Units | FILM NO. 42 | FILM NO. 43 | FILM NO. 44 |
|---|---|---|---|---|
| Strain @ Yield MD | % | 6 | 8 | 9 |
| Stress @ 5% Strain MD | PSI | 1,591 | 2,098 | 2,186 |
| Stress @ 10% Strain MD | PSI | 1,574 | 2,292 | 2,451 |
| Stress @ 25% Strain MD | PSI | 1,561 | 2,252 | 2,421 |
| Stress @ 50% Strain MD | PSI | 1,560 | 2,233 | 2,399 |
| Stress @ 100% Strain MD | PSI | 1,589 | 2,273 | 2,451 |
| TEA MD | FtLb/in$^2$ | 1,379 | 1,353 | 1,015 |
| Elmendorf Tear MD Arm | g | 200 | 200 | 200 |
| Elmendorf Tear MD | gf | 95 | 46 | 43 |
| Tensile Gauge TD | mil | 2.18 | 2.06 | 1.94 |
| Stress @ Peak TD | PSI | 2,685 | 2,777 | 2,469 |
| Strain @ Peak TD | % | 246 | 245 | 196 |
| Stress @ Break TD | PSI | 2,685 | 2,775 | 2,469 |
| Strain @ Break TD | % | 246 | 245 | 196 |
| Stress @ Yield TD | PSI | 2,261 | 2,117 | 1,827 |
| Strain @ Yield TD | % | 15 | 19 | 18 |
| Stress @ 5% Strain TD | PSI | 1,295 | 956 | 880 |
| Stress @ 10% Strain TD | PSI | 1,962 | 1,560 | 1,400 |
| Stress @ 25% Strain TD | PSI | 2,232 | 2,209 | 1,989 |
| Stress @ 50% Strain TD | PSI | 2,177 | 2,259 | 2,099 |
| Stress @ 100% Strain TD | PSI | 2,231 | 2,343 | 2,214 |
| TEA TD | FtLb/in$^2$ | 943 | 967 | 691 |
| Elmendorf Tear TD Arm | g | 800 | 400 | 200 |
| Elmendorf Tear TD | gf | 262 | 136 | 116 |
| Dart Drop (26") | g | 313 | 233 | 281 |
| § Slow Puncture - ¼" (D3) | gf | 1,278 | 1,428 | 953 |

Example 7

Polyethylene-Based Gas-Permeable Barrier Films Prepared by Co-Extrusion

A three-layer gas-permeable barrier film No. 45 was made by co-extrusion of the formulation shown in Table 38. Film no. 45 had a basis weight of 75 gsm.

TABLE 38

Composition of Formulation used for Co-Extrusion of Film No. 45.

| EXTRUDER | Layer % (Total) | COMPONENT | Amount of Component (Weight %) |
|---|---|---|---|
| C**** | 20 | CF7414 | 70 |
|  |  | EXCEED LL3518 | 29 |
|  |  | 102823 | 1.0 |
| B** | 60 | CF7414 | 70 |
|  |  | LL3518 | 30 |
| C*** | 20 | CF7414 | 70 |
|  |  | LL3518 | 29 |
|  |  | 102823 | 1.0 |

****Cast Roll
**Core
***Vacuum box side

An additional three-layer gas-permeable barrier films No. 46 was made by co-extrusion of the formulation shown in Table 39. The film no. 46 had a basis weight of 75 gsm.

TABLE 39

Composition of Formulation used for Co-Extrusion of Film No. 46.

| EXTRUDER | Layer % (Total) | COMPONENT | Amount of Component (Weight %) |
|---|---|---|---|
| C**** | 20 | CF7414 | 80 |
|  |  | EXCEED LL3518 | 19 |
|  |  | 102823 | 1.0 |
| B** | 60 | CF7414 | 80 |
|  |  | LL3518 | 20 |
| C*** | 20 | CF7414 | 80 |
|  |  | LL3518 | 19 |
|  |  | 102823 | 1.0 |

****Cast Roll
**Core
***Vacuum box side

An additional three-layer gas-permeable barrier film No. 47 was made by co-extrusion of the formulation shown in Table 40. The film no. 47 had a basis weight of 75 gsm.

TABLE 40

Composition of Formulation used for Co-Extrusion of Film No. 47.

| EXTRUDER | Layer % (Total) | COMPONENT | Amount of Component (Weight %) |
|---|---|---|---|
| C**** | 20 | CF7414 | 99 |
|  |  | 102823 | 1.0 |
| B** | 60 | CF7414 | 100 |
| C*** | 20 | CF7414 | 99 |
|  |  | 102823 | 1.0 |

****Cast Roll
**Core
***Vacuum box side

An additional three-layer gas-permeable barrier film No. 48 was made by co-extrusion of the formulation shown in Table 41. The film no. 48 had a basis weight of 75 gsm.

TABLE 41

Composition of Formulation used for Co-Extrusion of Film No. 48.

| EXTRUDER | Layer % (Total) | COMPONENT | Amount of Component (Weight %) |
|---|---|---|---|
| C**** | 20 | CF7414 | 70 |
|  |  | 9260 | 29 |
|  |  | (Total S. A., HDPE) |  |
|  |  | 102823 | 1.0 |
| B** | 60 | CF7414 | 70 |
|  |  | 9260 | 30 |
| C*** | 20 | CF7414 | 70 |
|  |  | 9260 | 29 |
|  |  | 102823 | 1.0 |

****Cast Roll
**Core
***Vacuum box side

The composition of the CaCO$_3$-containing compound CF7414 shown in each of Tables 38, 39, 40, and 41 is the same as that specified in Table 21 above.

The molten webs formed by extrusion of the formulations shown in Tables 38, 39, 40, and 41 were quenched by a chill cast vacuum box process in accordance with the present disclosure. The resultant films 45, 46, 47, and 48 were each subjected to CD IMG stretching and post-stretching according to the conditions summarized in Table 42 below, and each had a basis weight of 75 gsm. The Gurley porosity testing was done in triplicate and the average Gurley porosities for films 45-48 is listed in Table 42.

TABLE 42

Conditions For Stretching Films Prepared from Formulations in Tables 38-41 and their Corresponding Gurley Porosities.

|  | FILM NO. | | | |
|---|---|---|---|---|
|  | 45 | 46 | 47 | 48 |
| CD IMG (inches) | 0.14 | 0.14 | 0.14 | 0.14 |
| POST-STRETCH TEMP. (° F.) | 200 | 200 | 200 | 200 |
| POST-STRETCH (%) | 50/50 | 50/50 | 0/0 | 50/0 |
| GURLEY POROSITY RUN 1 (SECONDS) | 461 | 507 | 148 | 205 |
| GURLEY POROSITY RUN 2 (SECONDS) | 341 | 431 | 178 | 204 |
| GURLEY POROSITY RUN 3 (SECONDS) | 303 | 449 | 165 | 193 |
| GURLEY POROSITY AVERAGE (SECONDS) | 368 | 462 | 164 | 201 |

Example 8

Polypropylene-Based Gas-Permeable Barrier Films Prepared by Co-Extrusion

A three-layer gas-permeable barrier film No. 49 was made by co-extrusion of the formulation shown in Table 42. Film no. 49 had a basis weight of 75 gsm.

TABLE 42

Composition of Formulation used for Co-Extrusion of Film No. 49.

| EXTRUDER | Layer % (Total) | COMPONENT | Amount of Component (Weight %) |
|---|---|---|---|
| C**** | 20 | T1000J2 | 80 |
|  |  | C702-20 | 19 |
|  |  | 102823 | 1.0 |
| B** | 60 | T1000J2 | 80 |
|  |  | C702-20 | 20 |
| C*** | 20 | T1000J2 | 80 |
|  |  | C702-20 | 19 |
|  |  | 102823 | 1.0 |

****Cast Roll
**Core
***Vacuum box side

An additional three-layer gas-permeable barrier film No. 50 was made by co-extrusion of the formulation shown in Table 43. The film no. 50 had a basis weight of 75 gsm.

TABLE 43

Composition of Formulation used for Co-Extrusion of Film No. 50.

| EXTRUDER | Layer % (Total) | COMPONENT | Amount of Component (Weight %) |
|---|---|---|---|
| C**** | 20 | T1000J2 | 90 |
|  |  | C702-20 | 9 |
|  |  | 102823 | 1.0 |
| B** | 60 | T1000J2 | 90 |
|  |  | C702-20 | 10 |
| C*** | 20 | T1000J2 | 90 |
|  |  | C702-20 | 9 |
|  |  | 102823 | 1.0 |

****Cast Roll
**Core
***Vacuum box side

The composition of the CaCO$_3$-containing compound T1000J2 shown in each of Tables 42 and 43 is the same as that specified in Table 2 above.

The molten webs formed by extrusion of the formulations shown in Tables 42 and 43 were quenched by a chill cast vacuum box process in accordance with the present disclosure. The resultant films 49 and 50 were each subjected to CD IMG stretching and post-stretching according to the conditions summarized in Table 44 below, and each had a basis weight of 75 gsm. The Gurley porosity testing was done in triplicate and the average Gurley porosities for films 49 and 50 is listed in Table 44.

TABLE 44

Conditions For Stretching Films Prepared from Formulations in Tables 42 and 43, and their Corresponding Gurley Porosities.

|  | FILM NO. | |
|---|---|---|
|  | 49 | 50 |
| CD IMG (inches) | 0.1 | 0.1 |
| POST-STRETCH (%) | 0 | 0 |
| GURLEY POROSITY RUN 1 (SECONDS) | 446 | 339 |
| GURLEY POROSITY RUN 2 (SECONDS) | 502 | 326 |

TABLE 44-continued

Conditions For Stretching Films Prepared from Formulations in
Tables 42 and 43, and their Corresponding Gurley Porosities.

| | FILM NO. | |
|---|---|---|
| | 49 | 50 |
| GURLEY POROSITY RUN 3 (SECONDS) | 500 | 347 |
| GURLEY POROSITY AVERAGE (SECONDS) | 483 | 337 |

The overall thickness of the gas-permeable barrier films and/or multi-layer gas-permeable barrier films in accordance with the present disclosure may be varied depending on the particular end use for which the film is manufactured. As described above, the beneficial properties of gas-permeable barrier films and/or multi-layer gas-permeable barrier films prepared in accordance with the present disclosure may include one or more of high gas transmission rate (e.g., high porosity), moisture barrier protection, microbial barrier protection, and/or the like. However, basis weights and thicknesses may be easily adjusted to fit a desired end use.

The invention claimed is:

1. A process for making a gas-permeable barrier film comprising the steps of
    extruding a composition that comprises a polyolefin and an inorganic filler to form a molten web, the inorganic filler having an average particle size less than about 9.5 microns,
    casting the molten web against a surface of a chill roll to form a quenched film, wherein the molten web is configured to hit the surface of the chill roll within a distance of less than about 3 inches, and
    stretching the quenched film to form a gas-permeable barrier film having a Gurley porosity of less than about 300 seconds and a basis weight of between about 60 gsm and about 100 gsm, wherein the stretching comprises cross-directional intermeshing gear (CD-IMG) stretching and machine direction (MD) stretching, wherein at least a portion of the stretching is performed at a temperature of between about 60 degrees Fahrenheit and about 225 degrees Fahrenheit, and wherein the MD stretching occurs after the CD-IMG stretching.

2. The process of claim 1, wherein the casting comprises using an air knife, an air blanket, a vacuum box, or a combination thereof to cast the molten web against the surface of the chill roll.

3. The process of claim 2, wherein the polyolefin comprises polyethylene, polypropylene, or a combination thereof.

4. The process of claim 3, wherein the gas-permeable barrier film has a basis weight of less than about 80 gsm.

5. The process of claim 3, wherein the inorganic filler comprises from about 30% to about 75% by weight of the gas-permeable barrier film.

6. The process of claim 5, wherein the gas-permeable barrier film has a basis weight of between about 70 gsm and about 80 gsm.

7. The process of claim 5, wherein the average particle size of the inorganic filler is between about 0.1 microns and about 9 microns.

8. The process of claim 2, wherein the polyethylene comprises low density polyethylene, high density polyethylene, linear low density polyethylene, ultra-low density polyethylene, or a combination thereof.

9. The process of claim 2, further comprising annealing the gas-permeable barrier film in which the annealing is performed at a temperature of between about 75 degrees Fahrenheit and about 225 degrees Fahrenheit.

10. The process of claim 1, wherein the casting comprises using an embossing roll.

11. The process of claim 1, wherein the inorganic filler comprises an alkali metal carbonate, an alkaline earth metal carbonate, an alkali metal sulfate, an alkaline earth metal sulfate, or a combination thereof.

12. The process of claim 1, wherein the inorganic filler is selected from the group consisting of sodium carbonate, calcium carbonate, magnesium carbonate, barium sulfate, magnesium sulfate, aluminum sulfate, magnesium oxide, calcium oxide, alumina, mica, talc, silica, clay, glass spheres, titanium dioxide, aluminum hydroxide, zeolites, and a combination thereof.

13. The process of claim 1, wherein the inorganic filler comprises calcium carbonate.

14. The process of claim 1, further comprising annealing the gas-permeable barrier film.

15. The process of claim 1, wherein the gas-permeable barrier film has a basis weight of less than about 100 gsm.

16. The process of claim 1, wherein the gas-permeable barrier film has a basis weight of less than about 90 gsm.

17. The process of claim 1 wherein the molten web is configured to hit the surface of the chill roll within a distance of less than or equal to about 1 inch.

18. The process of claim 1 wherein the gas-permeable barrier film has a water vapor transmission rate (WVTR) ranging from 8,538 $g/(m^2*day)$ to 25,522 $g/(m^2*day)$.

19. A process for making a gas-permeable barrier film comprising the steps of
    extruding a composition that comprises polyethylene, polypropylene, or a combination thereof and an alkaline earth metal carbonate to form a molten web, the alkaline earth metal carbonate comprising at least about 50% by weight of the gas-permeable barrier film,
    casting the molten web against a surface of a chill roll under negative pressure by a vacuum box to form a quenched film, wherein the molten web is configured to hit the surface of the chill roll within a distance of less than about 3 inches,
    stretching the quenched film by cross-directional intermeshing gear (CD IMG) stretching followed by post-stretching in a machine direction to form a gas-permeable barrier film having a Gurley porosity of less than about 300 seconds and a basis weight of between about 70 gsm and about 80 gsm, wherein at least a portion of the stretching is performed at a temperature of between about 60 degrees Fahrenheit and about 225 degrees Fahrenheit, and
    annealing the gas-permeable barrier film at a temperature of between about 75 and about 225 degrees Fahrenheit.

20. The process of claim 19 wherein the molten web is configured to hit the surface of the chill roll within a distance of less than or equal to about 1 inch.

21. The process of claim 19 wherein the gas-permeable barrier film has a water vapor transmission rate (WVTR) ranging from 8,538 $g/(m^2*day)$ to 25,522 $g/(m^2*day)$.

22. A process for making a gas-permeable barrier film comprising the steps of
    extruding a composition that comprises a polyolefin and an inorganic filler to form a molten web, the inorganic filler having an average particle size less than about 9.5 microns, casting the molten web against a surface of a chill roll to form a quenched film, wherein the molten web is configured to hit the surface of the chill roll within a distance of less than about 3 inches, and stretching the quenched film to form a gas-permeable barrier film having a Gurley porosity of less than about 300 seconds, wherein the stretching comprises cross-directional intermeshing gear (CD-IMG) stretching and machine direction (MD) stretching, wherein the MD stretching occurs after the CD-IMG stretching, wherein at least a portion of the stretching is performed at a temperature of between about 60 degrees Fahrenheit and about 225 degrees Fahrenheit, and wherein the gas-permeable barrier film has a basis weight of between about 60 gsm and about 100 gsm.

23. The process of claim 22 wherein the molten web is configured to hit the surface of the chill roll within a distance of less than or equal to about 1 inch.

24. The process of claim 22 wherein the gas-permeable barrier film has a water vapor transmission rate (WVTR) ranging from 8,538 $g/(m^2*day)$ to 25,522 $g/(m^2*day)$.

* * * * *